Dec. 9, 1969  O. J. M. SMITH  3,483,463
SYSTEM AND METHOD FOR ALTERNATING CURRENT
MACHINES, AND APPARATUS THEREFOR
Original Filed July 10, 1961  13 Sheets-Sheet 1
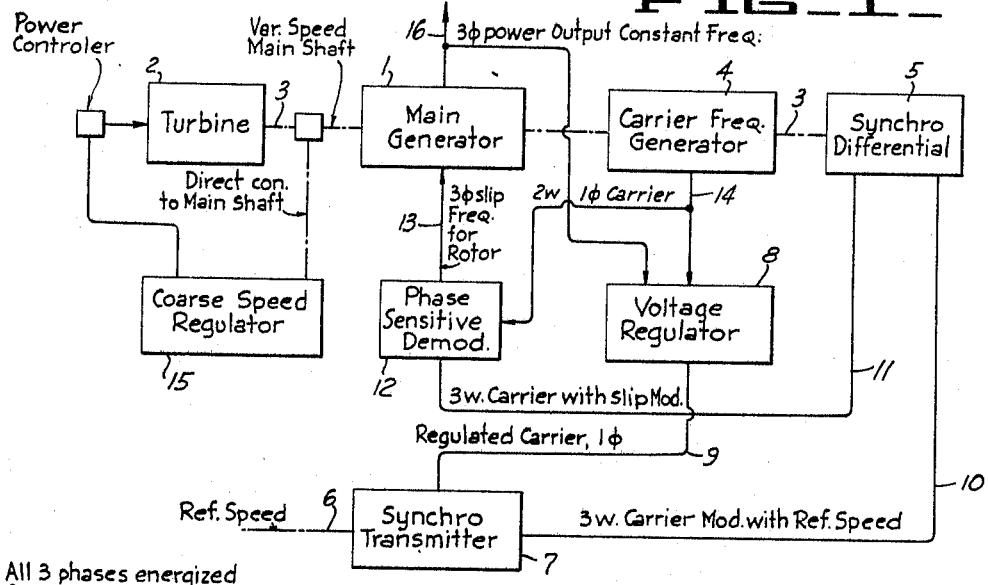
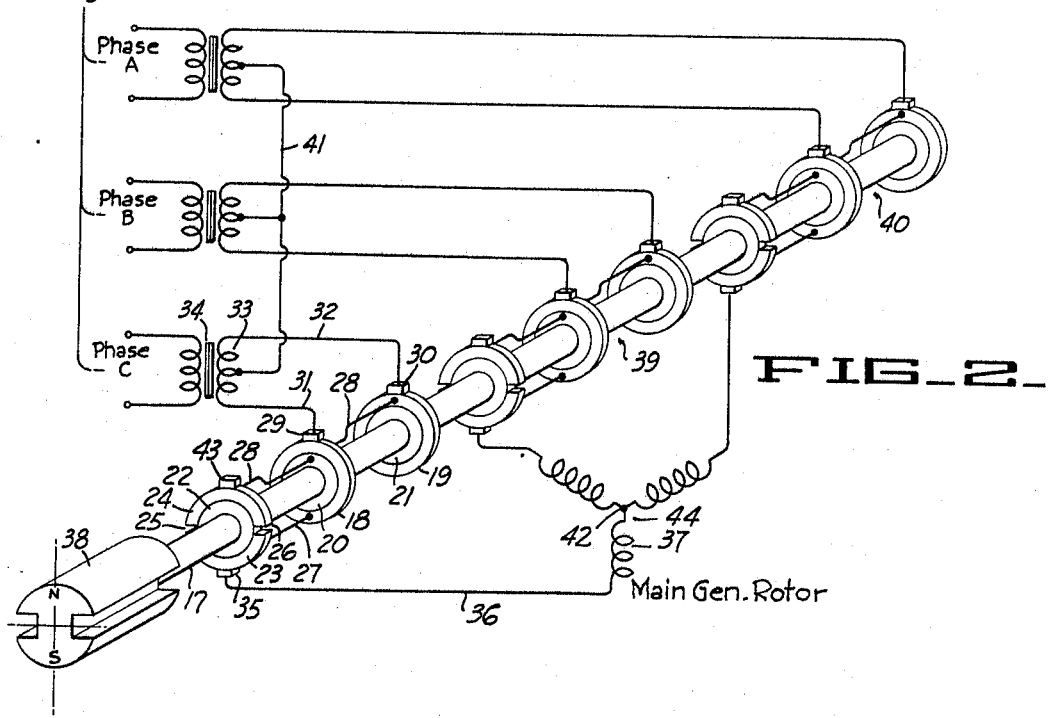
INVENTOR.
Otto J. M. Smith
BY
ATTORNEYS

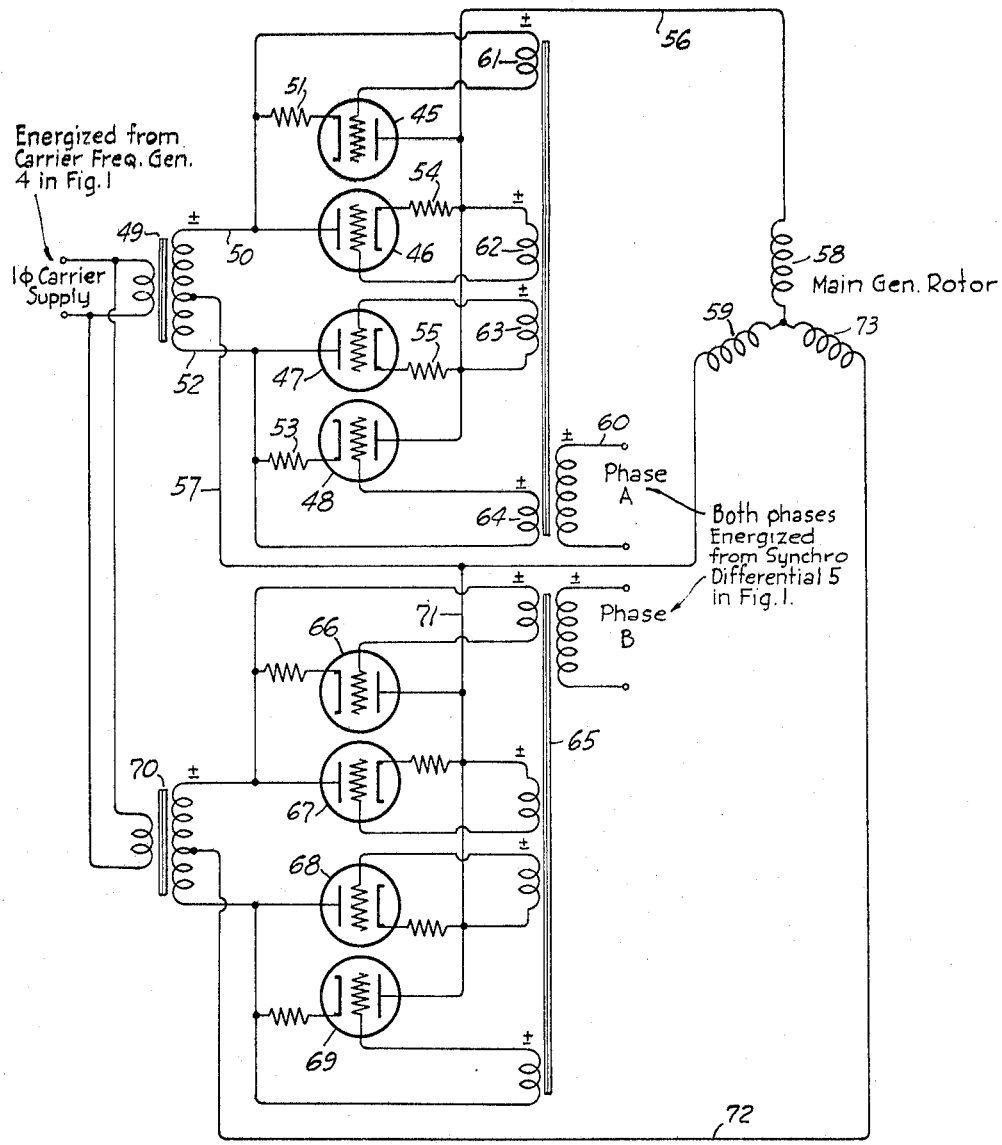
FIG_3_

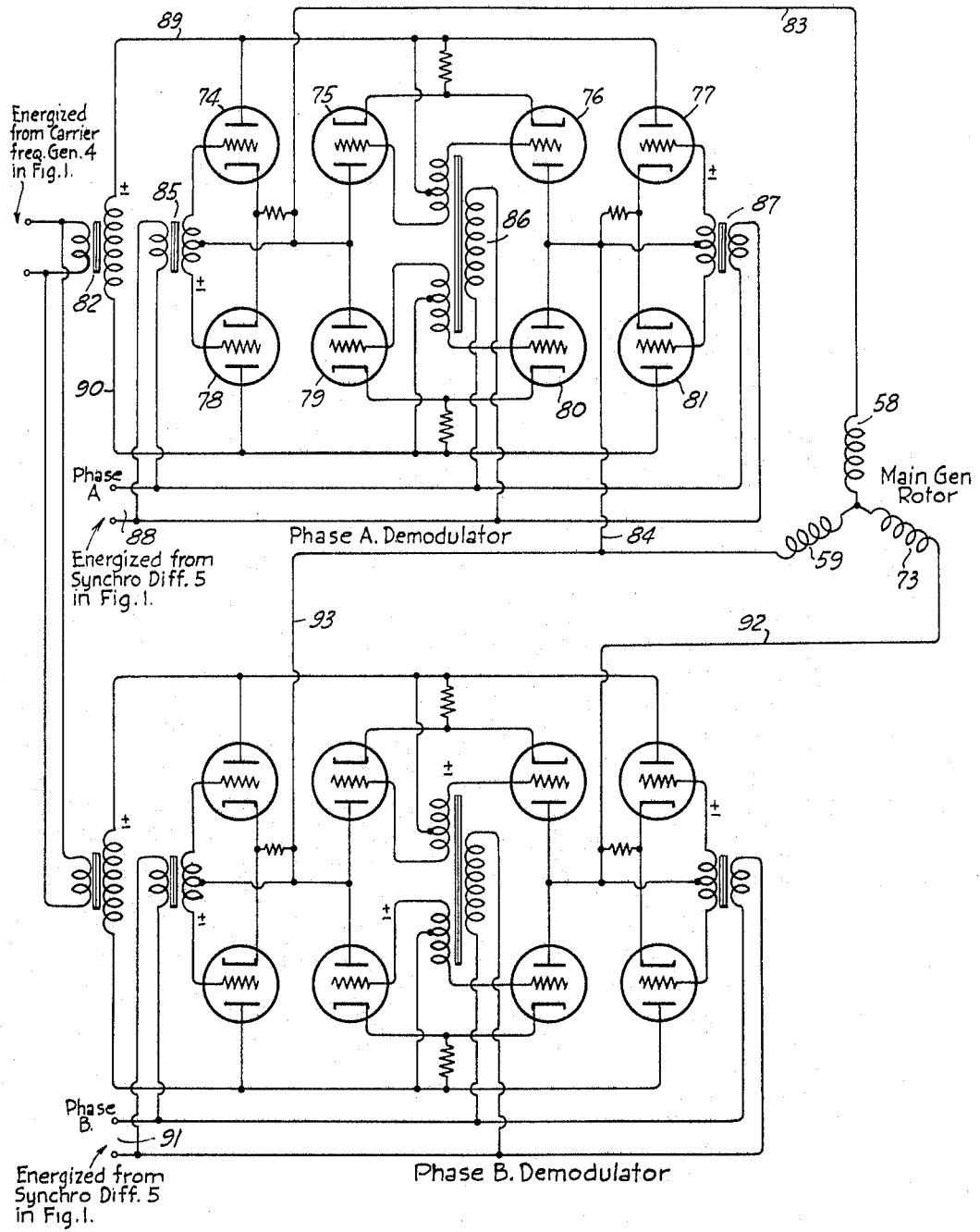
FIG_4_

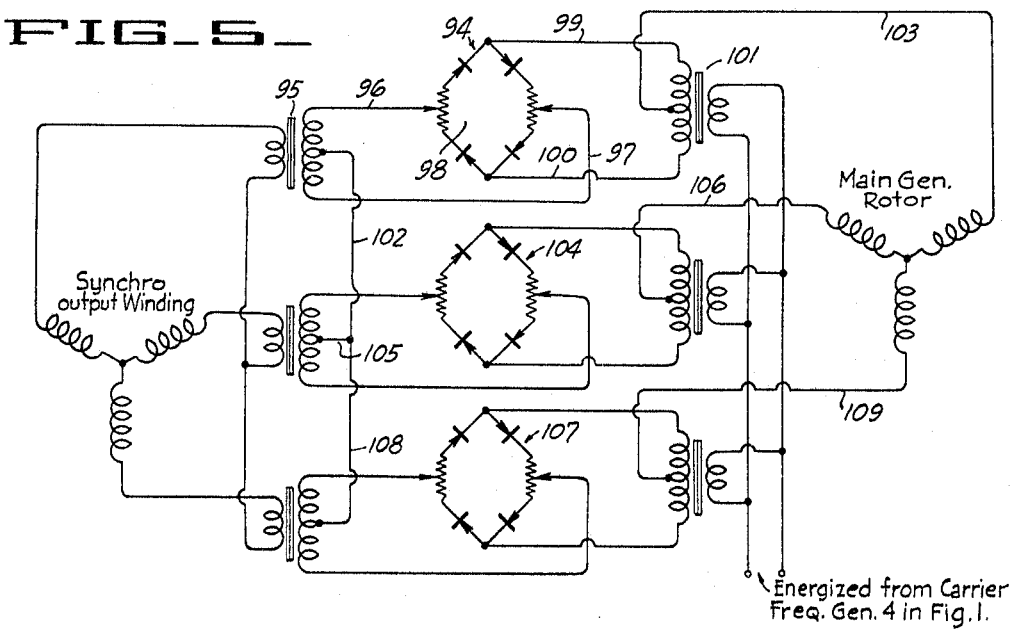
FIG_5_
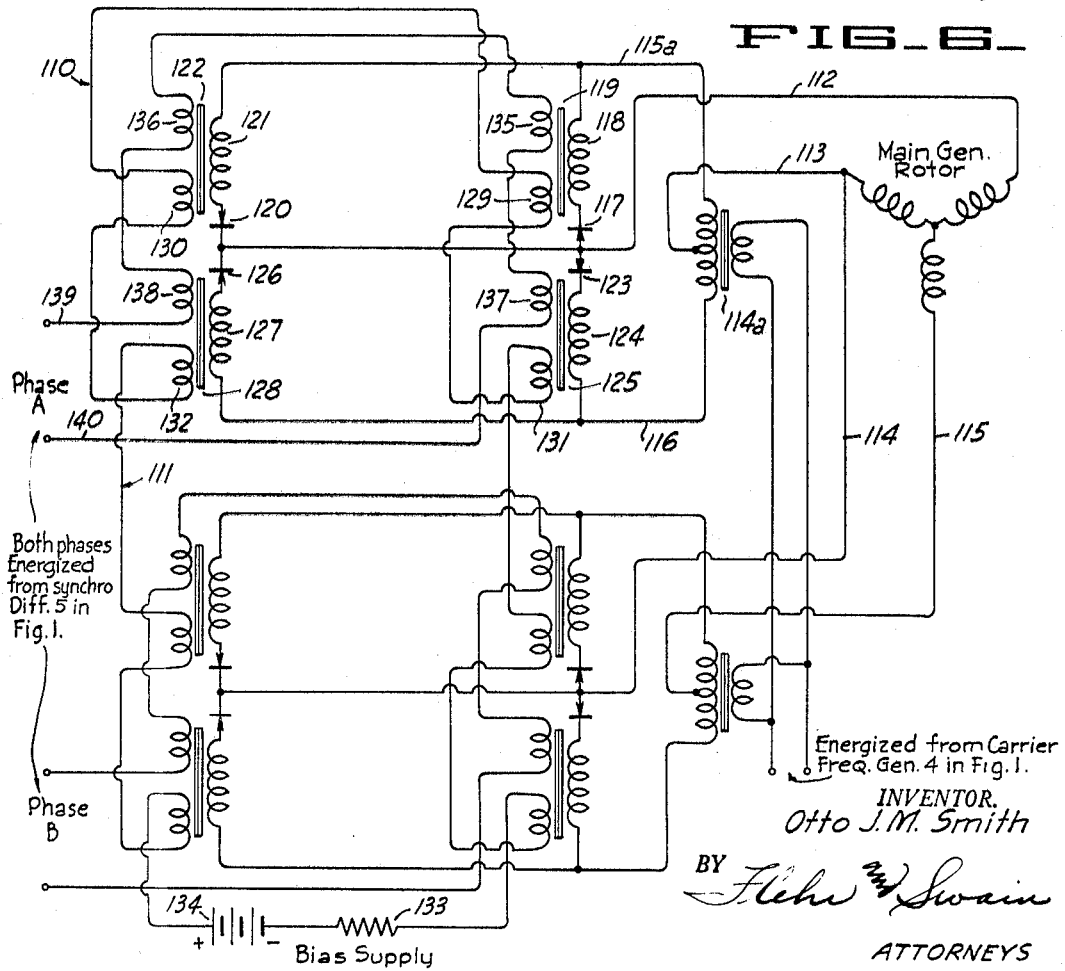
FIG_6_

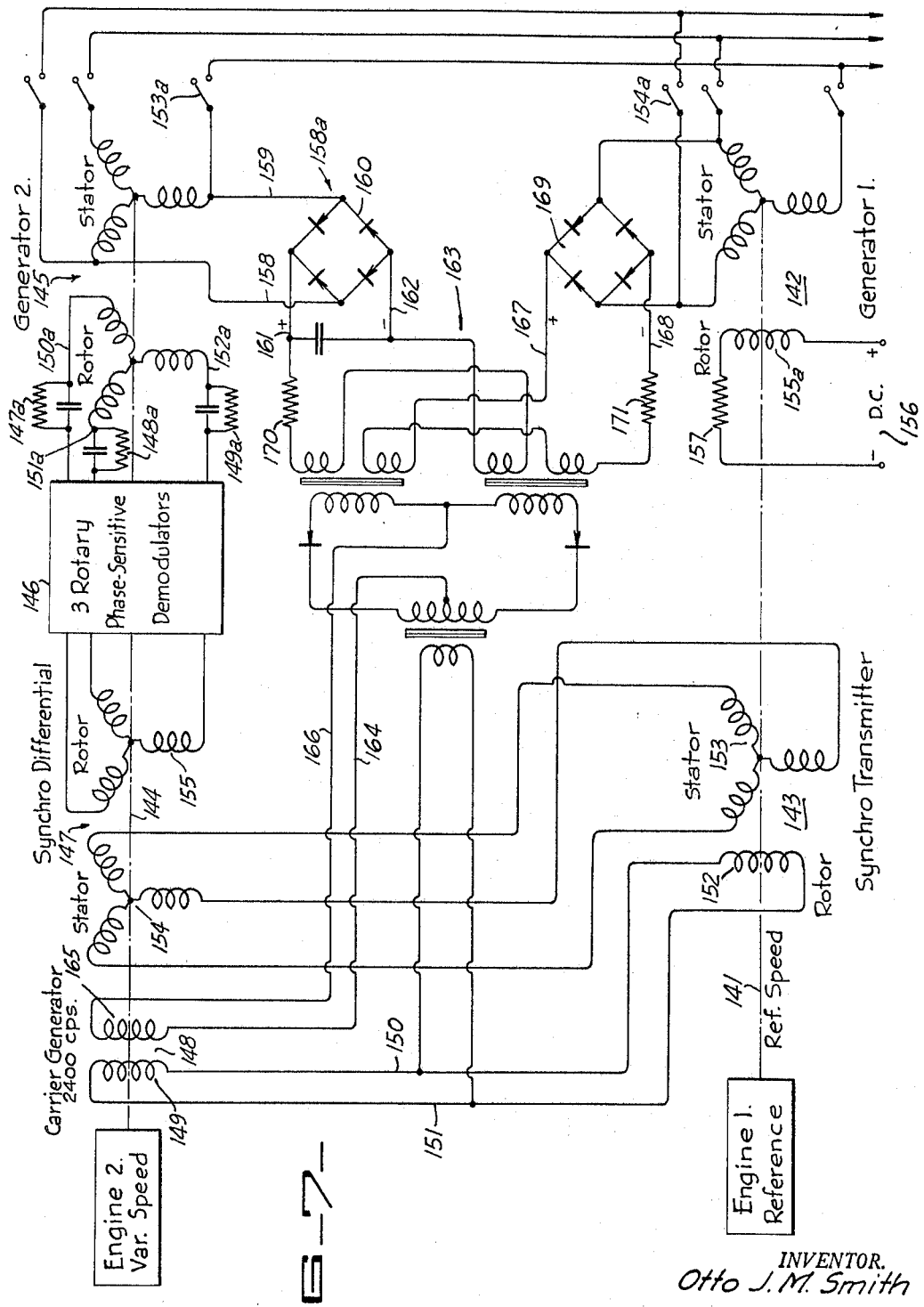

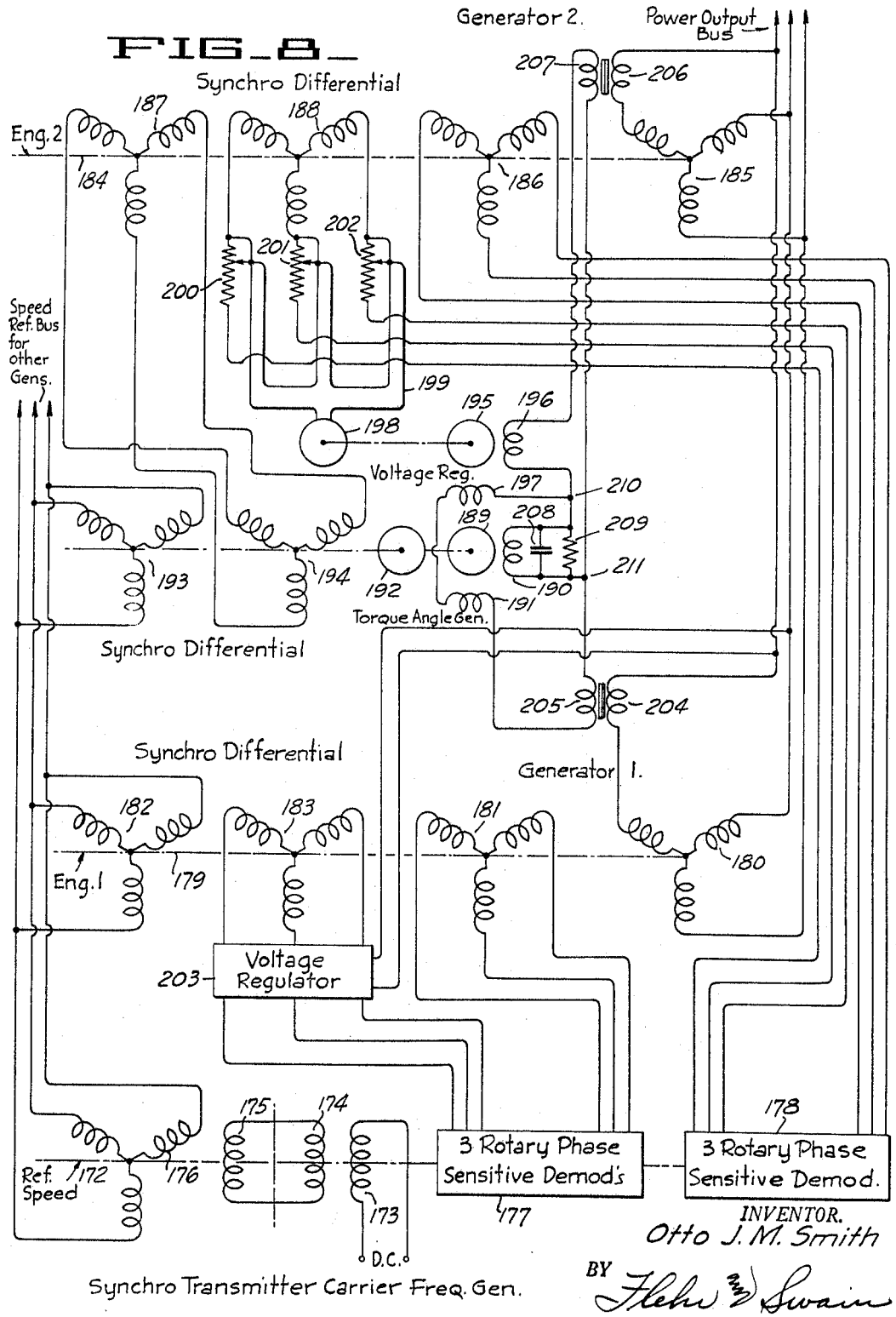

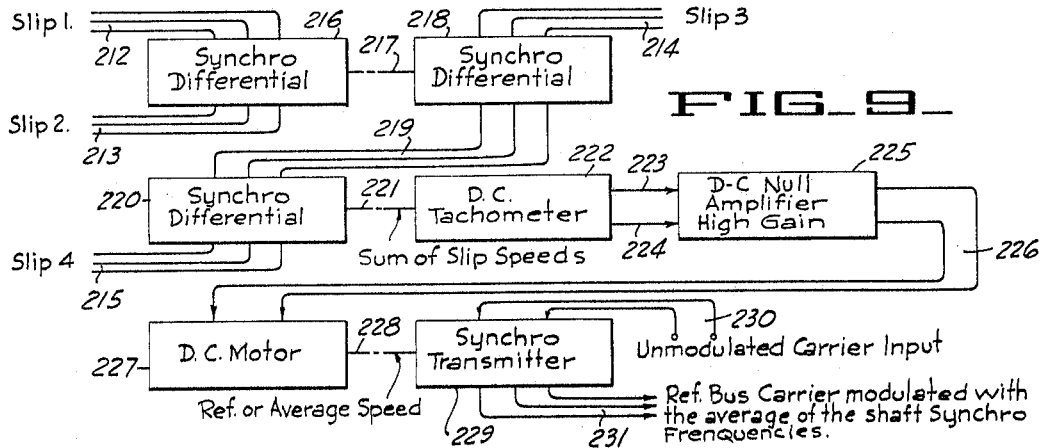
FIG_9_
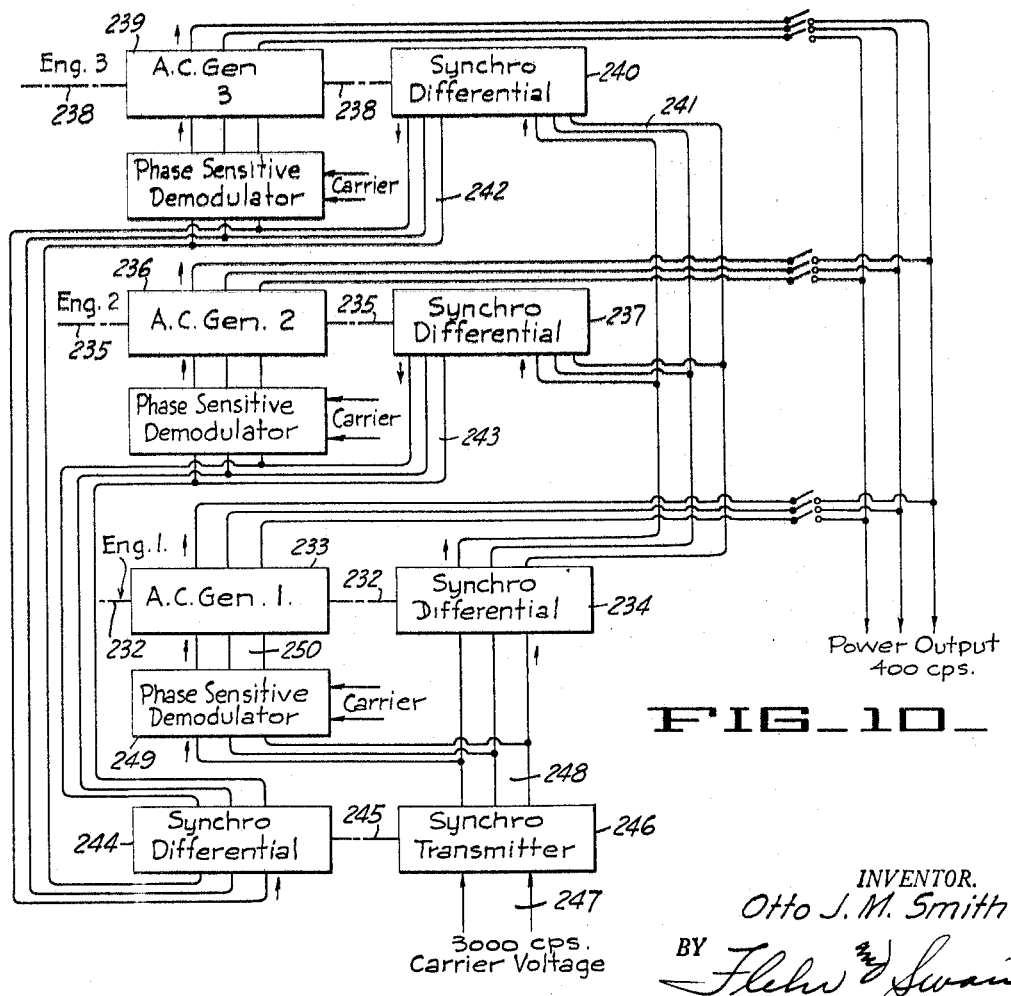
FIG_10_
INVENTOR.
Otto J. M. Smith
ATTORNEYS

Dec. 9, 1969                       O. J. M. SMITH                       3,483,463
SYSTEM AND METHOD FOR ALTERNATING CURRENT
MACHINES, AND APPARATUS THEREFOR
Original Filed July 10, 1961                               13 Sheets-Sheet 8
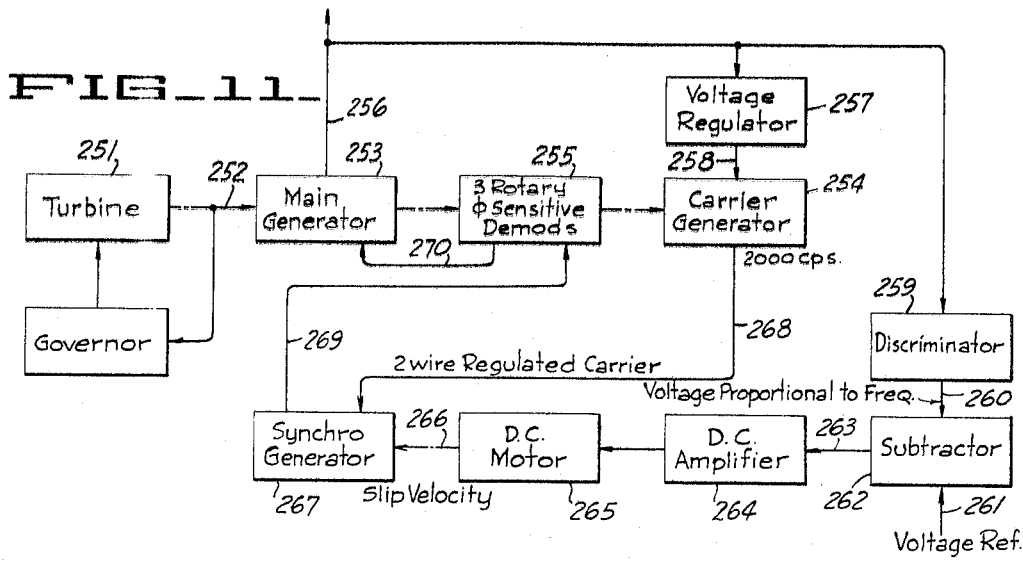
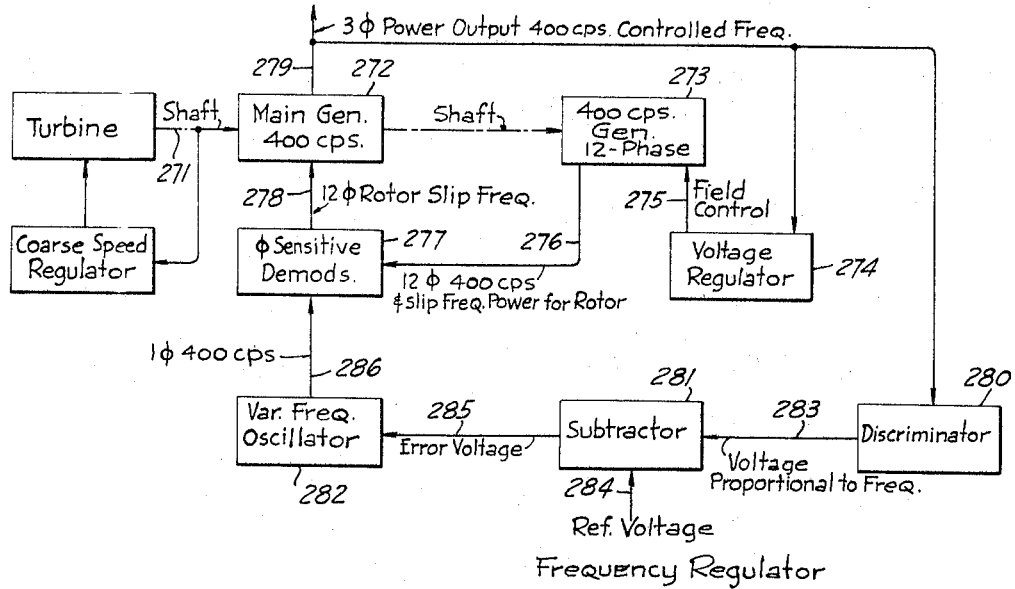
INVENTOR.
Otto J. M. Smith
BY
ATTORNEYS Dec. 9, 1969  O. J. M. SMITH  3,483,463
SYSTEM AND METHOD FOR ALTERNATING CURRENT
MACHINES, AND APPARATUS THEREFOR
Original Filed July 10, 1961  13 Sheets-Sheet 9
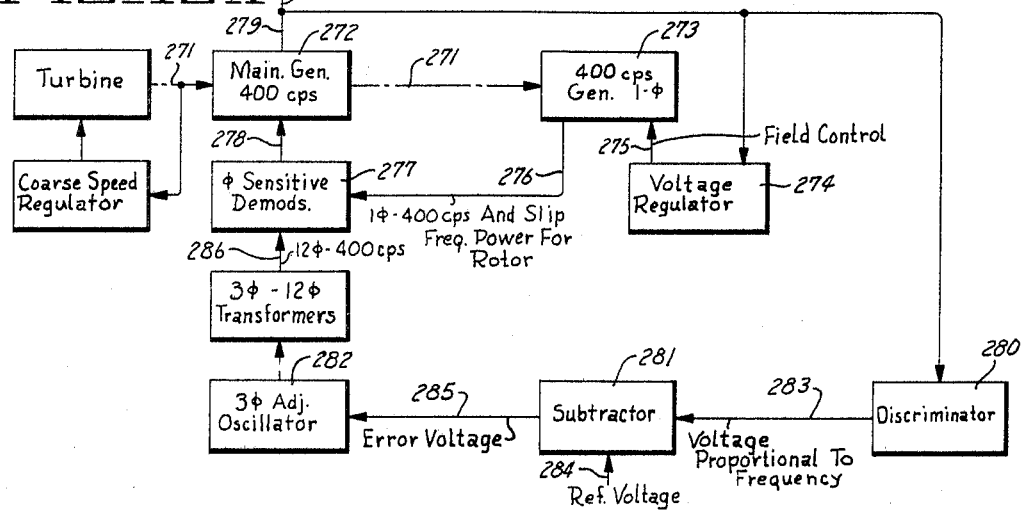
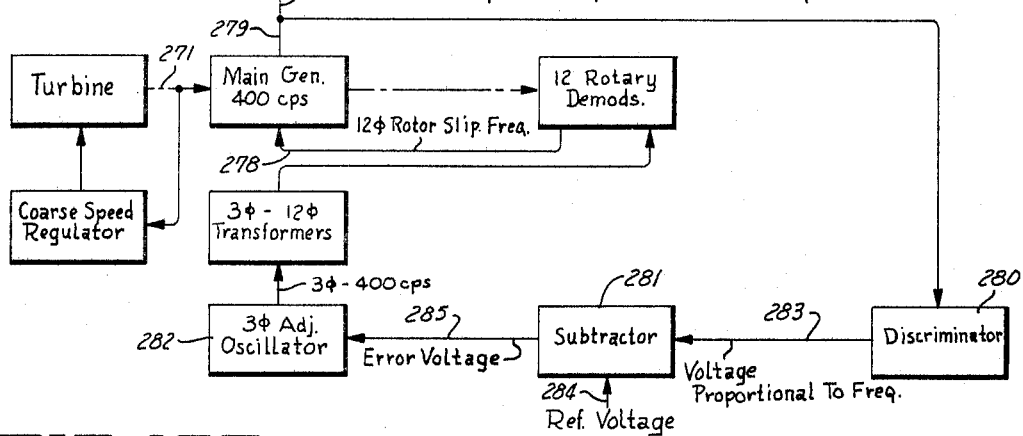
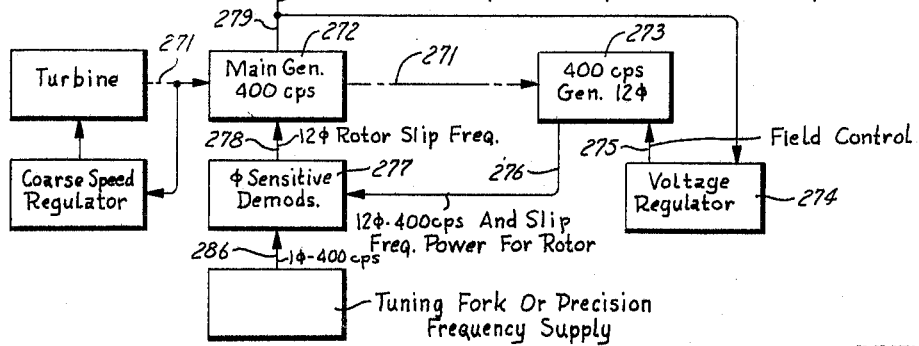
INVENTOR.
Otto J. M. Smith
BY
Flehr & Swain
ATTORNEYS Dec. 9, 1969
O. J. M. SMITH
3,483,463
SYSTEM AND METHOD FOR ALTERNATING CURRENT
MACHINES. AND APPARATUS THEREFOR
Original Filed July 10, 1961
13 Sheets-Sheet 10
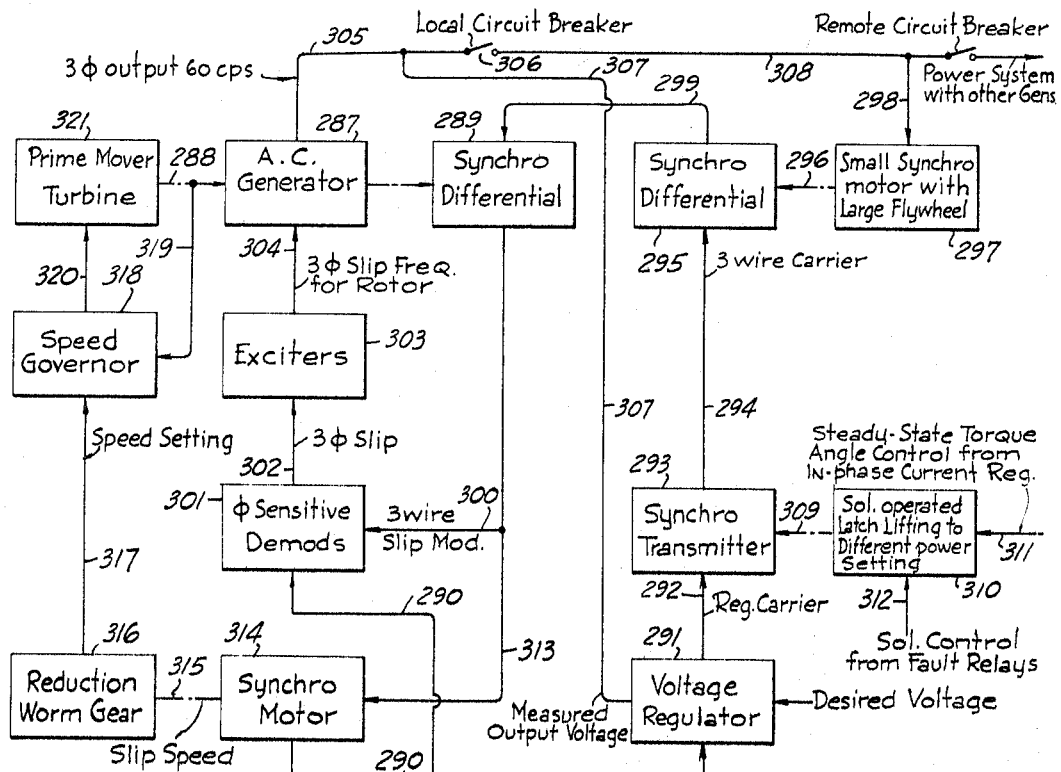
FIG_13_
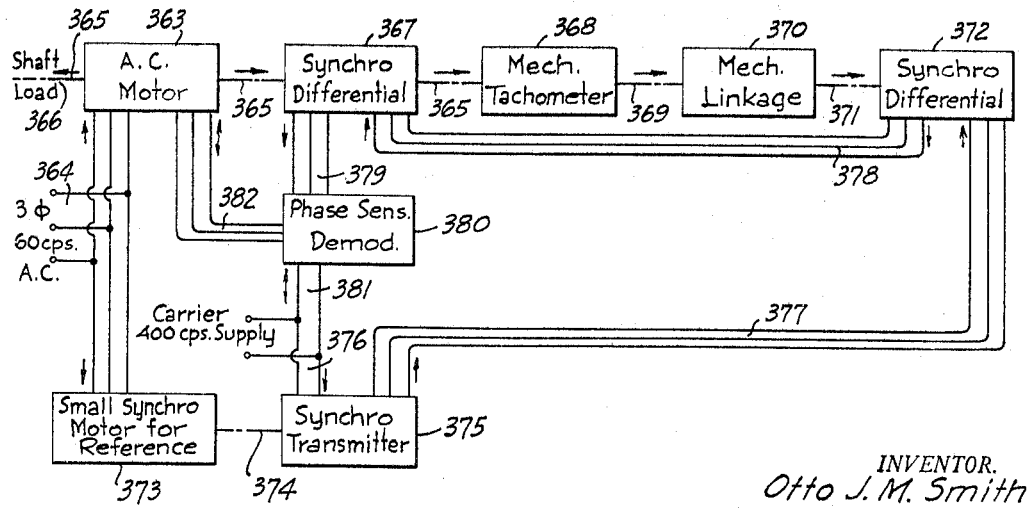
FIG_16_
INVENTOR.
Otto J. M. Smith
BY
Flehr & Swain
ATTORNEYS

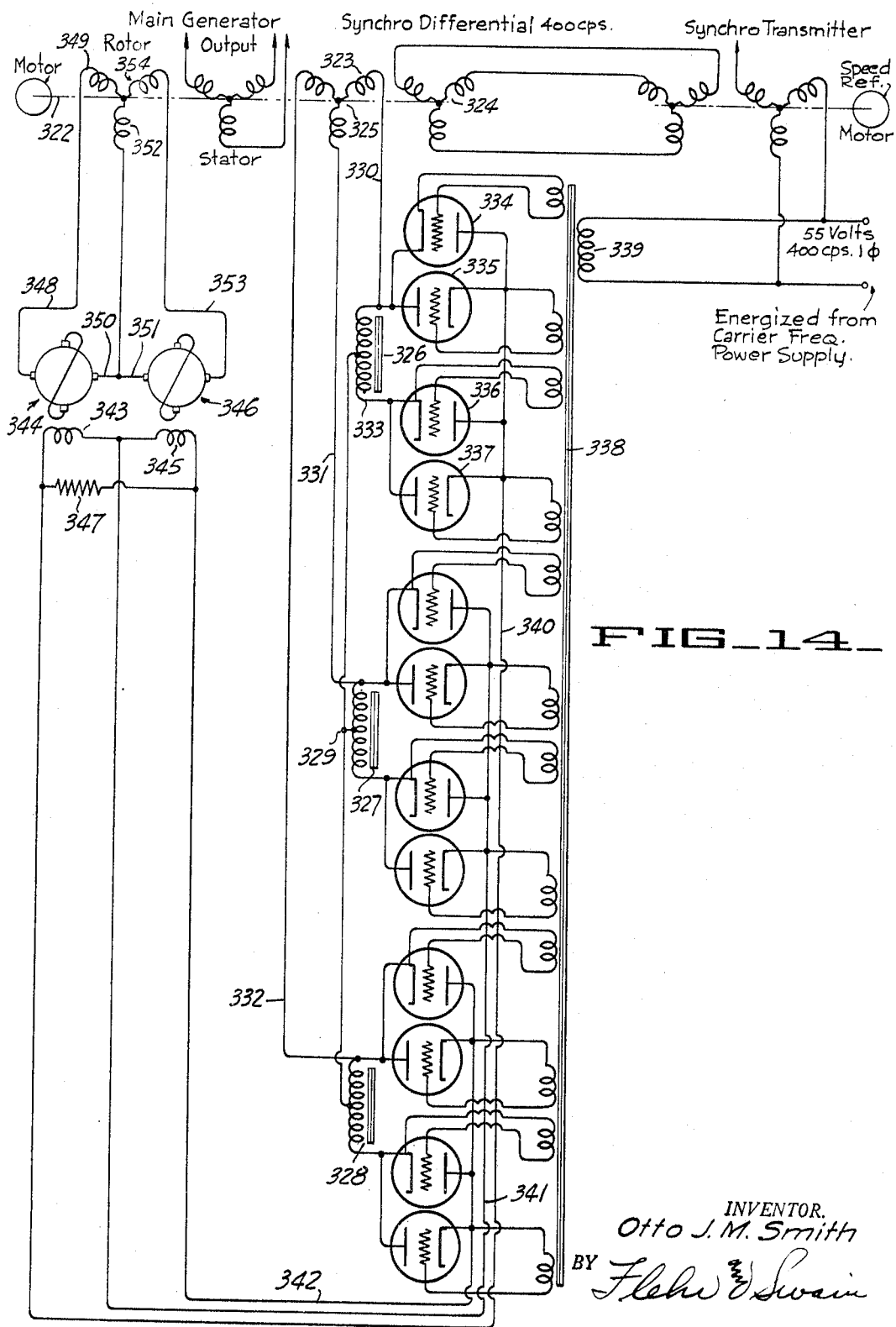

Dec. 9, 1969     O. J. M. SMITH     3,483,463
SYSTEM AND METHOD FOR ALTERNATING CURRENT
MACHINES, AND APPARATUS THEREFOR
Original Filed July 10, 1961     13 Sheets-Sheet 12
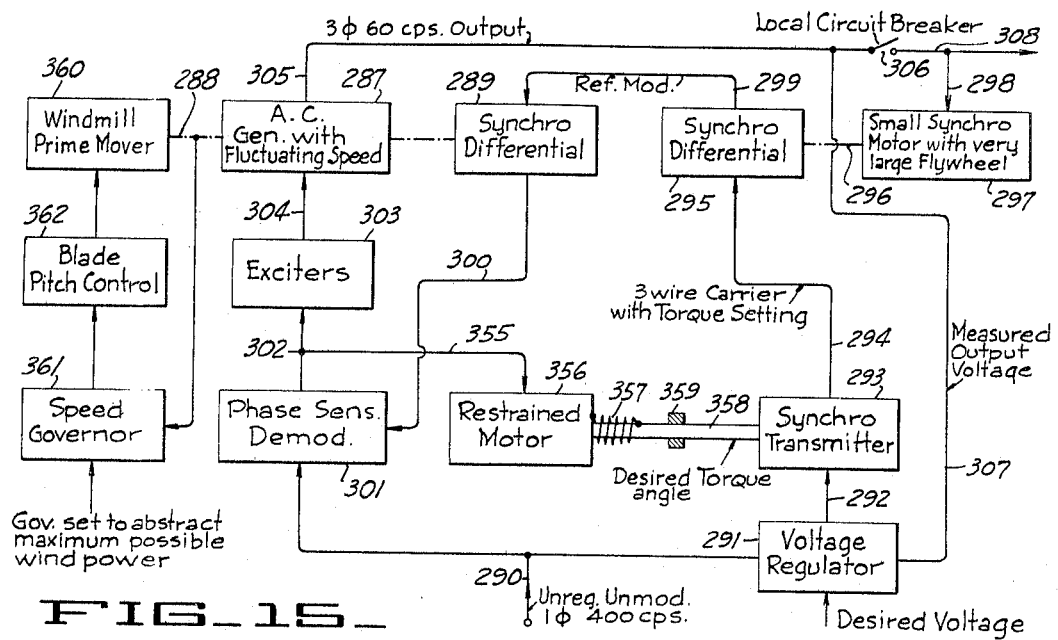
FIG_15_
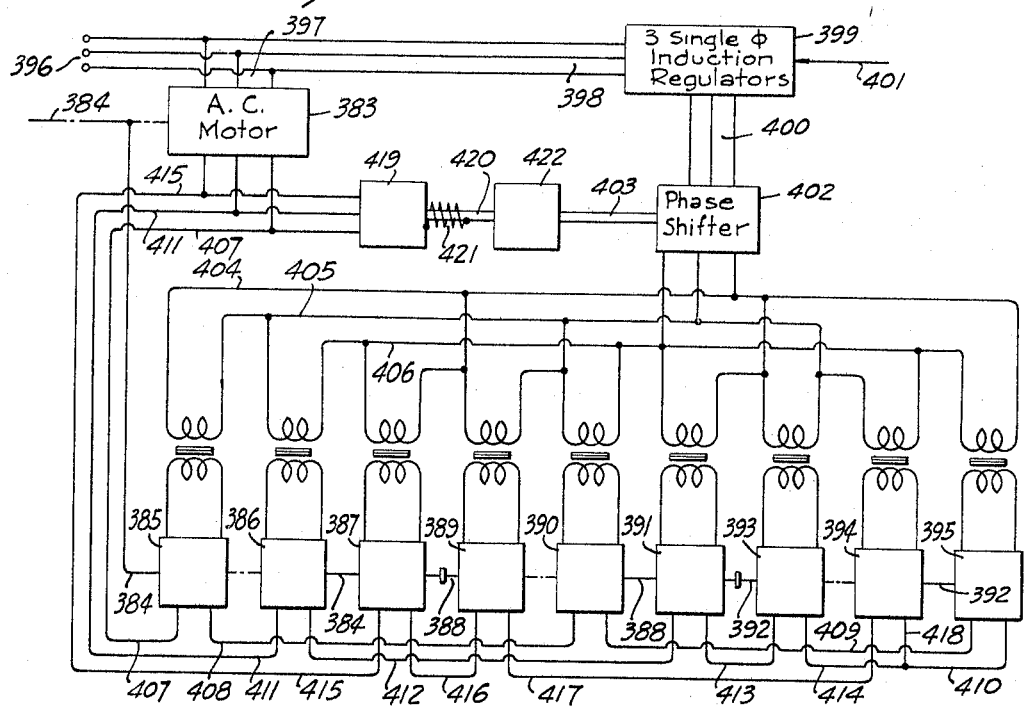
FIG_17_
INVENTOR.
Otto J. M. Smith
BY
ATTORNEYS Dec. 9, 1969          O. J. M. SMITH          3,483,463
SYSTEM AND METHOD FOR ALTERNATING CURRENT
MACHINES, AND APPARATUS THEREFOR
Original Filed July 10, 1961          13 Sheets-Sheet 13
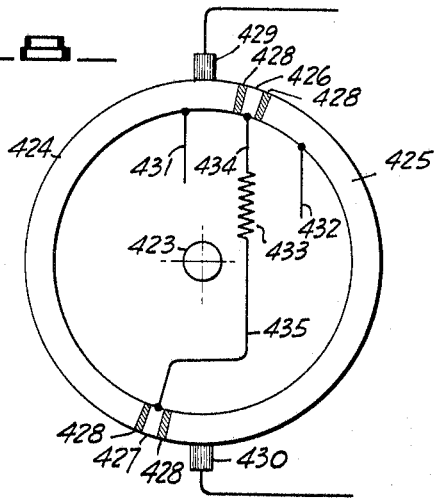
FIG_18_
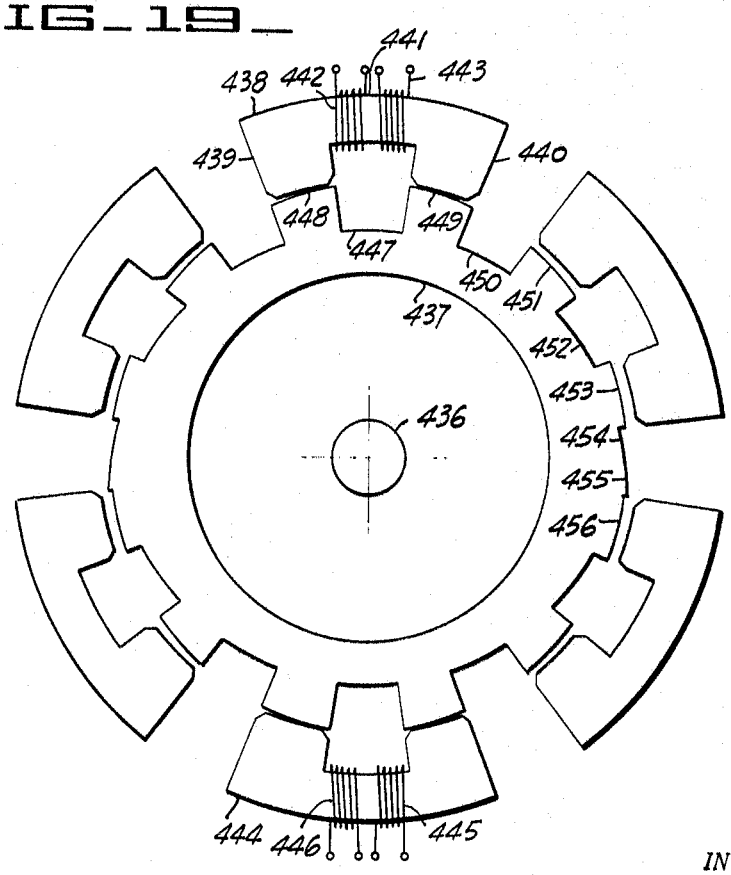
FIG_19_
INVENTOR.
Otto J. M. Smith
BY
ATTORNEYS

United States Patent Office

3,483,463
Patented Dec. 9, 1969

3,483,463
SYSTEM AND METHOD FOR ALTERNATING CURRENT MACHINES, AND APPARATUS THEREFOR
Otto J. M. Smith, 612 Euclid Ave.,
Berkeley, Calif. 94708
Continuation of application Ser. No. 122,959, July 10, 1961, This application Oct. 13, 1966, Ser. No. 586,569
Int. Cl. H02h 7/06; H02p 9/00, 11/00
U.S. Cl. 322—29
50 Claims This application is a continuation of application Ser. No. 122,959, filed July 10, 1961, which is a continuation of application Ser. No. 324,218, filed Dec. 5, 1952, now abandoned.

This invention relates generally to electrical systems and methods for the operation or control of alternating current machines, and to apparatus for use in such systems. In particular, the invention relates to the generation of a multi-phase slip frequency voltage and using the slip frequency voltage for exciting the excitation winding of the alternating current machine. The slip frequency voltage has a frequency which represents the difference between the desired synchronous speed of the machine shaft or rotor and the actual speed of the machine shaft or rotor.

Electrical machines of the alternating current type make use of an electromagnetic rotor or like movable part which rotates within an electromagnetic stator.

The conventional alternating current generator consists of a rotor with a two-terminal winding which carries direct current, producing a flux field which rotates at the same speed as the rotor, and which is approximately fixed in position relative to the rotor. Surrounding the rotor is a magnetic structure containing a stationary stator winding, in which are induced voltages due to the rotation of the field flux. The stator winding may be of any number of phases, but is commonly single phase or three phase. When the machine is loaded and stator current flows, the armature reaction produces a change in the field flux angular position on the rotor, but the flux continues to rotate at shaft speed.

In the conventional generator, the generated frequency is directly proportional to shaft speed. Two generators will not maintain synchronism if the prime mover shafts are rotating at different speeds. There is a need for a machine whose frequency can be controlled independently of shaft speed, as for example, in aircraft, where there may be several engines running at slightly different speeds, each with a generator directly coupled to it, and it is desired to connect all of the stator windings in parallel to a single power output bus.

In a large interconnected power system, if a fault should occur on a transmission line from a remotely located generating station, the circuit breakers at each end of the line will open, and the generators in the remote station will accelerate due to the sudden removal of the retarding load. The phase of their generated voltage will advance so far that, when the circuit breakers are reclosed, the generators will deliver excessive power as they slow down, and will start a transient oscillation of speed and power which is undesirable. If they are not reconnected to the system within a short time, like say 12 to 20 cycles, the phase of the generated voltage may have advanced so far that when the circuit breakers finally reclose, the generators will be unstable and will not stay in synchronism. They will continue to speed up and the local circuit breakers will open. For the system to remain stable, the extra mechanical energy stored in the generator moment of inertia must be transmitted to the power system during the first half cycle of the transient oscillation. There is a need for a field control for such power system generators to keep them automatically in synchronism with the power system, regardless of transient changes in speed, and which will not require the additional energy stored in the rotor moment of inertia due to increased speed to be transmitted to the power system in less than the governor operating time.

In the conventional windmill prime mover, gusts and changes in wind speed cause the shaft torque and speed to vary markedly. If a windmill generator is to deliver a constant power, the shaft speed must increase for the moment of inertia to absorb the high input power peaks, and the speed must decrease for the inertial energy to be transmitted to the generator. Therefore, there is a need for a constant-power variable-speed constant-frequency alternating current generator to operate from a windmill prime mover and be synchronized with a power system.

In the conventional alternating-current wound-rotor induction motor, the speed can be varied by introducing a variable external resistance in the rotor circuit, which is inefficient, or by introducing a three-phase low frequency, low voltage into the rotor circuit. The excitation is usually derived in such a manner that the rotor voltage is proportional to the rotor frequency. In conventional speed controls, it is difficult to vary the speed smoothly from under synchronous speed to over synchronous speed. There is a need for an improved method of exciting and controlling the rotor currents to adjust the motor power factor, and to adjust the shaft speed more accurately and easily. Also, there is a need for a means for specifying and controlling the speed-torque characteristic of an alternating current motor.

In the conventional alternating-current synchronous motor, the starting winding has low torque, the pull-in torque varies with the slip phase at which the field excitation is applied, and if the load exceeds the pull-out torque, the motor loses synchronism and the field excitation must be removed. There is a need for a motor to run synchronously, which will reduce its synchronous speed if the load torque becomes excessive, but will not fall out of synchronism, and which has high starting torque.

In general, it is an object of the present invention to provide a novel electrical system, method and apparatus which will enable a variation or adjustment with respect to certain operating characteristics of an alternating current machine.

Another object of the invention is to provide a novel system, method and apparatus for the generation of alternating current. Particularly in one application of the present invention, it is possible to specify the frequency and the phase of the generated voltage, independent of the speed of a generator shaft.

Another object of the invention is to provide a novel system and method and apparatus for generation of alternating current which makes possible automatic synchronization of one generator with another generating machine, or with a power system in which the machine is used.

Another object of the invention is to provide novel system, method and apparatus for generating alternating current, that will reduce the transients due to reclosing the load on the armature of a generator, after the load has been removed due to a fault.

Another object of the invention is to provide novel control means for an electric current generator which will provide improved control of the power and reactive volt-amperes delivered.

Another object of the invention is to provide a novel control for an alternating current generator which is applicable when the generator is connected to a fluctuating power source, and which makes it possible to deliver a constant average power with a much smaller moment of inertia than would ordinarily be required.

Another object of the invention is to provide a novel control which will make it possible to specify the generated frequency but not the phase, independent of the speed of the generator shaft.

Another object of the invention is to provide a novel system, method and apparatus for torque regulation, and which is applicable to either alternating current motor or generators.

Another object of the invention is to provide an alternating current generating system, method and apparatus which will make possible variable frequency while maintaining a constant speed of rotation.

Another object of the invention is to provide a novel electrical system and method incorporating an alternating current motor, and control means, which will make it possible to vary the speed of the motor while the motor is operating from a constant frequency supply.

Another object of the invention is to provide a novel system and method incorporating an alternating current motor and control means for the same, which will enable the motor to run synchronously, but with provision for reducing the speed during excessive loads and for automatically increasing the speed when the load reduces.

Another object of the invention is to provide a novel system and method incorporating an electrical motor and control means for the same, which will make it possible for the motor to run synchronously at a speed different from a synchronous speed corresponding to the speed of the alternating current supplied.

Another object of the invention is to provide a system and method of the above character which will provide a motor with improved externally adjustable and controllable speed-torque characteristics.

Another object of the invention is to provide a system and method of the above character with improved means for rapidly changing the output power of an alternating current generator.

Additional objects and features of the invention will appear from the following description in which the preferred embodiments have been set forth in detail in conjunction with the accompanying drawing.

Referring to the drawing:

FIGURE 1 is a block diagram illustrating one embodiment of the present invention, applied to the control of the generated phase and frequency of an aircraft generator.

FIGURE 2 is a drawing illustrating one form of rotary phase-sensitive demodulator for use in the system of FIGURE 1.

FIGURE 3 is a circuit diagram illustrating two high-vacuum tube full wave phase-sensitive demodulators in open delta for use in the system of FIGURE 1.

FIGURE 4 is a circuit diagram illustrating two high-vacuum tube bridge type phase-sensitive demodulators in open delta which can be used alternatively in the system of FIGURE 1.

FIGURE 5 is a circuit diagram illustrating three ring-diode phase-sensitive demodulators wye-connected, which can be used alternatively in the system of FIGURE 1.

FIGURE 6 is a circuit diagram illustrating two open-delta phase-senstive demodulators using self-saturated magnetic amplifiers, which can be used alternatively in the system of FIGURE 1.

FIGURE 7 is a circuit diagram illustrating one embodiment of the present invention, applied to two aircraft generators.

FIGURE 8 is a circuit diagram illustrating another embodiment of this invention, applied to regulate several aircraft generators for equal output currents.

FIGURE 9 is a circuit diagram illustrating the production of a reference speed for FIGURE 1 and FIGURE 8, which is the average of several shaft speeds.

FIGURE 10 is a circuit diagram illustrating another embodiment of this invention, applied to the parallel operation of several generators with different shaft speeds.

FIGURE 11 is a block diagram illustrating another embodiment of this invention, applied to control the frequency but not the phase of a generator, by means of an adjustable direct voltage.

FIGURE 12 is a block diagram illustrating another embodiment of this invetnion, applied to control the frequency but not the phase of a generator, by means of an adjustable direct voltage.

FIGURES 12A, 12B and 12C are block diagrams illustrating modifications of the embodiment of the invention shown in FIGURE 12.

FIGURE 13 is a block diagram illustrating another embodiment of this invention, applied to a stationary generator with automatic synchronizing.

FIGURE 14 is a circuit diagram illustrating another embodiment of this invention using thyratron demodulators.

FIGURE 15 is a block diagram illustrating another embodiment of this invention, applied to regulate the power from a windmill generator.

FIGURE 16 is a circuit diagram illustrating another embodiment of this invention, applied to control the speed-torque characteristic of an alternating current motor.

FIGURE 17 is a block diagram illustrating another embodiment of this invention, applied to control the slip-torque characteristics of a motor, utilizing a fundamental frequency reference for deriving the rotor excitation.

FIGURE 18 is a drawing of one of the segmented slip rings of a rotary demodulator, with means for improving commutation.

FIGURE 19 is a drawing showing the rotor construction for a synchronously-modulated carrier-frequency generator.

The present invention is characterized by the use of novel means for producing a rotating magnetic flux field within an alternating current machine, the speed of rotation differing from the mechanical speed of the shaft. More specifically, the present invention makes use of an alternating current machine having a multiple phase wound rotor, and means for generating a multiple phase slip frequency voltage for exciting the wound rotor, from multiple voltages of a frequency higher than the slip frequency. These multiple higher frequency voltages represent the difference between the desired speed of the rotating flux field and the actual machine shaft speed.

One method of representing a speed in such a machine is to generate a multiple-phase voltage whose frequency is proportional to the speed. A multiple-phase difference frequency or slip frequency is obtained by rectifying the voltage representing the machine speed in a multiple-phase phase-sensitive demodulator using as a single-phase reference voltage one whose frequency and phase represents the desired flux speed and phase.

Another method of representing a speed is to amplitude-modulate three identical high-frequency carrier voltages with a three-phase low frequency, which modulation frequency is proportional to the speed. This is accomplished with a synchro transmitter. Using a synchro differential, the desired flux speed is subtracted from the shaft speed modulation, yielding a three-phase slip speed or slip frequency amplitude modulated on the high frequency carrier. The three-phase slip frequency for rotor excitation is obtained by rectifying the modulated carrier in three phase-sensitive demodulators using the unmodulated single-phase carrier voltage for the reference.

Other methods of representing speeds are to use other kinds of modulations or synchronous commutators as hereinafter described.

First, my invention will be described for the purpose of controlling the generated phase and frequency of an alternating current generator. FIGURE 1 illustrates such an embodiment, and in this instance it is assumed that the generator is of the aircraft type. It is conventional practice to drive such a generator by a mechanical connection with a gas turbine or a like motive means.

As diagrammatically illustrated in FIGURE 1, I have shown a main generator 1 of the aircraft type, and which is constructed like an induction motor with a three-phase stator and a three-phase distributed wound rotor. By way of example, this generator can be designed and operated to deliver current at 400 c.p.s. It is driven by an aircraft engine or turbine 2 through shaft 3 to which is directly connected a 2000 c.p.s. carrier frequency generator 4 and a synchro differential 5. The desired generated frequency and phase and the desired flux speed in generator 1 is controlled by the speed and phase of a reference shaft 6 to which is connected a synchro transmitter 7. The construction of the synchro differential and synchro transmitter is well known in the art, and is described on pages 237 and 238 of The Electronic Control Handbook, by R. R. Batcher and W. Moulic, Caldwell-Clements Publishing Co., Inc., 1946, under the titles of synchro differential generator and synchro generator respectively. The two synchros 5 and 7 have the same number of poles as the main generator, and the speed of shaft 6 is equal to the desired speed of the magnetic flux field rotating in the main generator. The 2000 c.p.s. single-phase output 9 of the voltage regulator 8 is connected to excite the salient pole rotor of the synchro transmitter. The transmitter output 10 is three single-phase carrier voltages modulated with the three-phase reference synchronous frequency. This excites the input winding of synchro differential 5 in such a phase sequence that the differential output 11 consists of three carrier voltages amplitude modulated with a three-phase slip frequency which is the difference between the desired reference frequency and the generator shaft synchronous frequency. This three-wire slip modulation on circuit 11 is rectified in the phase-sensitive demodulator 12 to produce a three-phase slip frequency voltage 13 which is applied to excite the rotor windings of the main generator 1. The rectification occurring in the phase-sensitive demodulator uses as its reference voltage the unmodulated output 14 of the carrier frequency generator 4.

The excursions in speed of the shaft 3 may be somewhat limited by the coarse speed regulator of governor 15, which operates from the main shaft 3 to control the fuel or power output of the engine 2.

The stator windings of generator 1 are connected to the power output bus 16. The magnitude of the output voltage on bus 16 is measured by the voltage regulator 8, and used in the usual negative feedback manner to control the voltage drop between the unregulated carrier generator output on circuit 14, and the regulated carrier voltage output 9 which excited the rotor of synchro transmitter 9, and which eventually determines the magnitude of the generator excitation 13 and the output voltage on bus 16.

Operation of the system of FIGURE 1 is as follows: The three-phase slip-frequency voltage 13 is connected to the generator rotor, and provides all of the excitation power. The magnetic flux field produced by these rotor currents rotates slowly at slip speed around the surface of the rotor. The phase sequence of the rotor currents is so chosen that the slip speed adds to the actual shaft speed if the shaft speed is below the desired flux speed. Therefore, the rotor currents produce a flux field which rotates in the air gap at constant speed with respect to the stator. If the shaft speed slows down, the synchro differential 5 subtracts less frequency from the carrier modulation, and the rotor excitation slip frequency increases correspondingly, so that the flux speed remains constant. Since the air-gap torque is approximately equal to the shaft torque, and the air-gap flux speed is different from the shaft speed, the stator electrical power and the shaft mechanical power are different. The rotor power supply must provide not only enough power to establish the rotor flux field, but additonal power to rotate it, which additional power contributes to the generator output power if the shaft speed is less than the flux speed. If the shaft speed is greater than the flux speed, this additional component of rotor power reverses direction and flows into the carrier generator, operating it as a motor.

One form of phase-sensitive demodulator is a rotary switch with slip rings and commutating segments. In this form, the reference phase for the rectification of a voltage is not another voltage of the same frequency, but the instantaneous phase angle of the shaft of the demodulator. In the embodiment of this invention illustrated in FIGURE 1, I can use such a rotary commutator type of phase-sensitive demodulator, attached directly or through gears to shaft 3.

FIGURE 2 shows three phase-sensitive demodulators of the rotary commutator type, which can be used in the embodiment of FIGURE 1. The carrier frequency generator shaft 17 has mounted on it two continuous slip rings and one segmented slip ring for each synchro phase. The copper slip rings 18 and 19 are each insulated from the shaft 17 by the insulating sleeves 20 and 21. The insulating sleeve 22 has mounted on it half slip rings 23 and 24, which are insulated from each other by thin mica sheets in the slots 25 and 26. Slip ring 18 is electrically conductively connected to half slip ring 23 by the wire 27, and slip ring 19 is electrically conductively connected to half slip ring 24 by the wire 28. Graphite brushes 29 and 30 are provided to give continuous contact with slip rings 18 and 19 respectively. They are connected through conductors 31 and 32 to opposite polarities on the center-tapped output winding 33 of a push-pull transformer 34, energized from one phase of the synchro differential 5 in FIGURE 1. The segmented slip ring 23 and 24 has a graphite brush 35 bearing on it, which is connected through conductor 36 to one phase 37 of the rotor of the main generator 1 in FIGURE 1.

The carrier frequency generator has a permanent magnet rotor 38 mounted on the shaft 17. Its flux field cuts the encircling stator windings to generate the carrier. If the center line of the stator output coils is horizontal in FIGURE 2, then the position shown corresponds to the instant of maximum carrier voltage.

The mechanism of action is as follows: The position of the brush 35 determines the reference phase for the rectification of the voltage in winding 33. In the position shown, the rotor winding 37 is connected to conductor 31 and will have the polarity and magnitude of the current in conductor 31. One-quarter of a revolution of the shaft 17 after the position shown in FIGURE 2, the brush 35 will leave segment 23 and contact segment 24. This occurs when the instantaneous carrier voltage is zero in all synchro phases. For the next half revolution, the current in winding 37 will equal in polarity and magnitude that in conductor 32. Since commutation occurred when the carrier was reversing polarity, the polarity of the current in winding 37 is the same on both half cycles of the carrier frequency.

The assemblage of units from 18 through 34 is called a demodulator, and performs the function of rectifying the carrier which is amplitude modulated at slip frequency in winding 33, so that the direct-current in winding 37 has the same polarity as conductor 31 when the shaft is in the position shown. When a time equal to one-half cycle of the slip frequency has elapsed, the phase of the carrier frequency in transformer 34 has reversed, so that the polarity of the direct-current in winding 37 will have reversed. The slowly changing direct current in winding 37 is actually the slip frequency.

The demodulator hereinbefore described may also be called an intermodulator or modulator. In general, an intermodulator is a device which multiplies two signals to obtain their product. Normally, one of the signals is modulated, whereas the other is unmodulated. As is well known to those skilled in the art, if the modulated signal is frequency modulated, then the output of the intermodulator gives a signal with a constant envelope amplitude with a frequency which is equal to the difference between the carrier frequency of the unmodulated signal and the frequency of the frequency modulated signal. If the modulated signal is amplitude modulated, then the output of the intermodulator gives a signal whose amplitude is equal to the amplitude of the amplitude modulation on the modulated signal. In addition, there is a spurious component in the output which is the second harmonic of the carrier frequency. For the special case, when the output of the intermodulator is a relatively low frequency compared with the frequency of the carrier frequency of one of the input signals, then the intermodulator is commonly called a "demodulator."

Three demodulators are shown in FIGURE 2. The first consists of the components 18 through 34, and the second and third demodulators, which are identical, are identified as 39 and 40 respectively. The angular orientation of the segmented slip rings and their brushes are all identical. The three demodulators are wye-connected through the conductor 41 joining the center taps of the synchro transformer secondary windings and the common junction 42 for the three rotor windings.

An alternative method is to use delta-connected demodulators. In such event an additional brush 43 diametrically opposite to brush 35 is needed on each segmented slip ring. The two terminals of winding 37 should both be brought out of the machine, and the end 44 connected to brush 43. Similar changes should be made on the other two rotor phases. The conductor 41 should be removed. Another alternative method is to use an open-delta connected demodulator. This requires that the three generator rotor phases be connected in delta, but only two demodulators and two synchro phases are needed to supply them. Another alternative method is to use two-phase synchros, only two demodulators, and a two-phase winding on the rotor of the main generator.

It is within the scope of this invention to use any number of phases in any type of Scott-T, open delta, balanced or unbalanced connection for the synchros, the demodulators, and the generator rotor.

FIGURE 3 is a circuit diagram illustrating another form of phase-sensitive demodulator using high vacuum tubes in a full wave connection. Two demodulators are shown connected in open delta. One demodulator consists of four vacuum tubes 45, 46, 47, and 48. The power comes from the center-tapped secondary winding of a single transformer 49, the primary of which is excited from the carrier generator. Terminal 50 of the secondary winding is connected to the plate of tube 46 and to the cathode resistor 51 of tube 45. Terminal 52 of the secondary winding is connected to the plate of tube 47 and to the cathode resistor 53 of tube 48. To the cathodes of tubes 46 and 47 are connected cathode resistors 54 and 55 respectively. One output conductor 56 is connected in common to the plates of tubes 45 and 48, and to the cathode resistors 54 and 55. The other output conductor 57 is connected to the center-tap of the secondary of transformer 49. Conductors 56 and 57 are connected respectively to the line terminals of windings 58 and 59 of the wye-connected main generator rotor.

The grids of the tubes 45, 46, 47, and 48 are controlled by the magnitude of the voltage from phase A of the synchro differential by means of a grid transformer with a primary winding 60 connected across the output of synchro phase A, and four secondary windings 61, 62, 63, and 64. Winding 61 is connected between the grid of tube 45 and conductor 50. Winding 62 is connected between the grid of tube 46 and conductor 56. Winding 63 is connected between the grid of tube 47 and conductor 56. Winding 64 is connected between the grid of tube 48 and conductor 52. The polarities are so chosen that the grids of tubes 45 and 46 are simultaneously positive with respect to their cathode at the same time that the grids of tubes 47 and 48 are negative with respect to their cathodes.

The mechanism of operation of one demodulator is as follows: During a particular half cycle of the carrier frequency, assume that conductor 50 is positive, and that simultaneously the grids of tubes 45 and 46 are positive, and the grids of tubes 47 and 48 are negative. Tubes 45 and 46 will be relatively good conductors, and current will flow from conductor 50 through tube 46 to conductor 56. On the next half cycle, tubes 47 and 48 will be conductive while conductor 52 is positive. Tube 47 therefore conducts current to conductor 56. A direct current flows through winding 58 to the rotor center tap.

After a time equal to one-half cycle of the slip frequency, the phase of the voltage from the synchro transformer in winding 60 will have reversed with respect to the carrier transformer 49. Now when the grids of tubes 45 and 46 are positive, conductor 60 is negative, and current flows from conductor 56 through tube 45 to conductor 50. The direction of the current in winding 58 has reversed. It therefore alternates at slip frequency.

The tubes can be the type commonly known as RCA–6AS7. They can be operated Class A, Class AB, or Class B. The bias and the amount of negative feedback is adjusted by the bias resistors 51, 53, 54, and 55. Large bias resistors force the output current in conductor 56 to be proportional to the voltage in winding 60.

The demodulators in FIGURE 2 are synchronous switches, and all of the generator excitation power comes from the synchro windings. The demodulators in FIGURE 3 are synchronous amplifiers. Only the grid power has to come from the synchros. The excitation power comes from the carrier transformer 49.

In FIGURE 3, the grid transformer 65, whose primary is connected to a different synchro phase than winding 60, supplies a second phase-sensitive demodulator with its associated tubes 66, 67, 68, 69, and carrier supply transformer 70. The slip frequency output on conductors 71 and 72 is 120 degrees out of phase with the slip voltage between conductors 56 and 57, and by connecting conductor 71 to conductor 57, an open-delta three-phase slip frequency supply is available. Conductor 72 is connected to winding 73 of the rotor to complete the circuit for the three-phase slip-frequency rotor currents to flow, which causes the flux in the main generator to rotate synchronously.

It should be noted that in both FIGURE 2 and FIGURE 3, if the slip frequency is zero, the rotor receives full direct current excitation, the space phase of the flux depending on the magnitudes of the direct currents in the three rotor windings.

FIGURE 4 is a circuit diagram illustrating two high-vacuum-tube bridge type phase-sensitive demodulators in open-delta. Each four-tube demodulator in FIGURE 3 can be replaced by an eight-tube bridge-type demodulator for which the carrier power is supplied by a two-terminal carrier frequency transformer. This type of phase-sensitive demodulator and amplifier is illustrated in FIGURE 4 of the drawing. This can be used in the embodiment shown in FIGURE 1, as an alternative for FIGURE 2 or FIGURE 3. FIGURE 4, the phase A demodulator consists of the bridge connection of vacuum tubes 74, 75, 76, 77, 78, 79, 80, tnd 81, whose power supply is the carrier transformer 82, and whose slip-frequency output appears across conductors 83 and 84. The vacuum tubes are controlled by alternating-current grid potentials supplied from transformers 85, 86, and 87. The primaries of these three transformers are in parallel across the synchro phase A output 88.

The mechanism of operation of one demodulator is as follows: When the synchro output is in phase with the carrier, tubes 76, 77, 78 and 79 are conducting when conductor 89 is positive, and current flows through tube 77, conductor 84, rotor windings 59 and 58, conductor 83, tube 79, and conductor 90. On the next half cycle of the carrier, tubes 74, 75, 80, and 81 are conductive, and current flows through conductor 90, tube 81, conductor 84, windings 59 and 58, conductor 83, tube 75, and conductor 89. When the synchro output reverses its phase with respect to the carrier, the currents in conductors 83 and 84 reverse.

A second phase-sensitive demodulator is shown in FIGURE 4, with the reference voltage 91 from the synchro phase B, and single-phase slip frequency voltage output between conductors 92 and 93 which is 120 degrees out of phase with the voltage between conductors 83 and 84. Conductor 84 is connected to conductor 93 and winding 59, and conductor 92 is connected to winding 73, so that conductors 83, 84, and 92 form a three-phase open-delta slip frequency supply for the windings 58, 59, and 73.

The rotor current in FIGURE 4 produce a flux field rotating at slip speed around the rotor, which combines with the rotor mechanical speed, produces a flux field rotating synchronously in the air gap of the generator 1 in FIGURE 1.

FIGURE 5 is a circuit diagram illustrating three ring-diode phase-sensitive demodulators or intermodulators wye-connected, which can be used alternatively in the embodiment illustrated in FIGURE 1. The single-phase phase-sensitive demodulator or four-quadrant multiplier 94 shown in FIGURE 5 is a type well known in the art, but the connection of several with proper phasing for a multiple-phase supply is unique. Demodulator 94 consists of a center-tapped input transformer 95 exciting two diagonally opposite terminals 96 and 97 of a ring-diode bridge 98, whose other two terminals 99 and 100 are excited by the center-tapped reference transformer 101. The single-phase slip frequency appears between the two center taps 102 and 103.

In FIGURE 5, a second demodulator 104 for a different synchro phase delivers its output between conductors 105 and 106. A third demodulator 107 for the third synchro phase delivers its output between conductors 108 and 109. Conductors 102, 105, and 108 are connected together to form the center tap of a wye connection, and conductors 103, 106 and 109 deliver three-phase slip-frequency voltage to the main generator rotor.

FIGURE 6 is a circuit diagram illustrating two open-delta phase-sensitive demodulators using self-saturated magnetic amplifiers, which can be used alternatively in the embodiment illustrated in FIGURE 1.

The two demodulators 110 and 111 in FIGURE 6 deliver slip-frequency between conductors 112 and 113 for Phase A, and between conductors 114 and 115 for Phase B. Since the action of the two is similar, only one will be described. The carrier power comes through transformer 114a to a secondary with high voltage terminals 115a and 116, and a center tap connected to the output conductor 113. Between terminal 115a and the other output conductor 112 are connected in series a diode 117 and a load winding 118 on a saturable reactor 119. The polarity of the diode is such that the conductor 112 is negative when the winding 118 is conducting current. Between terminal 115a and conductor 112 are connected in series another diode 120 and a load winding 121 on a saturable reactor 122. The polarity of the diode is such that the conductor 112 is positive when this circuit is conducting. Between terminal 116 and conductor 112 are connected in series a diode 123 and winding 124 on a saturable reactor 125. The polarity of the diode is such that conductor 112 is negative when this circuit is conducting. Between terminal 116 and conductor 112 are connected in series a diode 126 and a load winding 127 on a saturable reactor 128. The polarity of the diode is such that conductor 112 is positive when this circuit is conducting. If there were no other windings on these four reactors, the cores would all be saturated by the direct-current components of the rectified load currents. The average direct-current in conductor 112 would be zero, because two reactors deliver positive and two deliver negative current.

Each reactor has two additional windings, one for bias and one for the input signal. The bias windings are 129, 130, 131, and 132 on cores 119, 122, 125, and 128, respectively. They are connected in series with other bias windings, resistor 133, and battery 134 in such a polarity that the bias current opposes the self-magnetization of the cores dues to the rectified load current. The magnitude of the bias current can be adjusted by resistor 133 for high gain and for optimum demodulation characteristics.

The input control windings are 135, 136, 137, and 138 on cores 119, 122, 125, and 128, respectively. The control windings are all connected in series between terminals 139 and 140 of the synchro phase A output. The polarity is such that when the terminal 139 is positive, the signal current flowing through windings 137 and 138 aids in saturating the cores 125 and 128 in the same direction as the rectified load currents, and in windings 135 and 136, the signal current aids in unsaturating the cores 119 and 122 by opposing the polarity of the flux due to the rectified load currents.

The mechanism of operation is as follows: When terminal 139 is positive, windings 127 and 124 have low impedance, and windings 135 and 136 have high impedance. Conductor 112 will therefore have the same polarity as terminal 116. On the next half cycle, windings 118 and 121 will conduct, connecting terminal 115a to conductor 112, and continuing to deliver the same polarity of rectified current to conductor 112 and to the rotor of the main generator. If the polarity of terminal 115a is positive during this conduction half-cycle, winding 121 and diode 120 will be conducting, but winding 118 will not conduct because diode 117 is blocking it. If terminal 116 is in phase with terminal 139, windings 121 and 127 will be conducting, and conductor 112 will be positive. If terminal 116 is in phase with terminal 140, windings 118 and 124 will be conducting, and conductor 112 will be negative.

The magntiude of the direct current flowing from 112 to 113 will be proportional to the magnitude of the alternating current flowing from 139 through the control windings to 140. The polarity of the output direct current from 112 to 113 is determined by the relative phase of the power supply voltage between 115 and 116, and the signal voltage between 139 and 140. As the phase and magnitude of the signal voltage changes at slip frequency, the output voltage follows this single-phase slip frequency.

FIGURE 7 is a circuit diagram illustrating one embodiment of the present invention, applied to two aircraft generators. The shaft of engine 1 is called the reference shaft 141, and on it is mounted the first generator 142 and a synchro transmitter 143 with the same number of poles as the generator. The shaft 144 of engine 2 has mounted on its the second generator 145, three rotary phase-sensitive demodulators 146 like those shown in FIGURE 2, a synchro differential 147, and a 2400 c.p.s carrier frequency generator 148. The differential 147 has the same number of poles as the generator 145. The demodulators 146 have the same number of slip ring segments as the half cycles per revolution of the carrier generator 148. Generators 142 and 145 each have the same number of poles and are constructed like three-phase wound rotor induction motors. The carrier frequency generator has an output winding 149 which is connected by conductors 150 and 151 to the salient pole rotor winding 152 of the synchro transmitter 143. The three-phase stator winding 153 of the transmitter 143 is connected to one of the three-phase windings 154 of the differential 147. The other windings 155 of the differential 147 supply the demodulators 146. In series with the three output conductors of the demodulators are three resistance-capacitance networks 147a, 148a, and 149a of the type commonly known in the servo-mechanisms art as phase-lead networks. To the output terminals 150a, 151a, and 152a of the phase-lead networks are connected the three phases of the three-phase wound rotor of the generator 145. The three-phase stator of generator 145 is connected in parallel with the three-phase stator of generator 142 through the sets of synchronizing switches 153a and 154a respectively. The single-winding rotor 155a of generator 142 is connected to a source of direct current 156 through an adjustable resistor 157.

The voltage produced by generator 145 is controlled by a voltage regulator 158a consisting of conductors 158 and 159 connected between one phase of generator 145 and the A-C terminals of the bridge rectifier 160 whose D-C terminals 161 and 162 supply a direct voltage which is a measure of the A-C voltage output of generator 145, and the full-wave rectifying magnetic amplifier 163, which is a type well known in the art. To the terminals 161 and 162 are connected one of the D-C input control circuits of the magnetic amplifier 163. The output of the magnetic amplifier consists of a current flowing out of conductor 164 through the excitation winding 165 of the carrier generator 148, and back through conductor 166. The polarity of the control is such that an increase of voltage between 161 and 162 causes a decrease in the current in conductor 164. A second D-C input control circuit on the magnetic amplifier is connected by conductors 167 and 168 to the output of the bridge rectifier 169, whose A-C input is the voltage across one phase of generator 142. There are two adjustable resistors 170 and 171, placed in series with the two control windings respectively of the magnetic amplifier.

The mechanism of phase control is as follows: The unmodulated carrier voltage in winding 152 becomes modulated with the desired frequency in the synchro windings 153, which voltages are then the excitation for the synchro differential 147. The differential output becomes in winding 155 the carrier modulated with the three-phase slip frequency or slip speed between the shafts 144 and 141. Since the carrier generator is on shaft 144, the rotary demodulator is also mounted on this same shaft, and its output to the lead networks and the rotor of generator 145, is the three-phase slip frequency, with the phase rotation so chosen that the flux field in generator 145 is rotating at the same speed and phase as shaft 141. Since the rotor windings of generator 145 have reactance, even at the low slip frequencies the rotor currents might not be in phase with the voltage outputs of the demodulators. For this reason, the phas-lead networks 147a, 148a, and 149a are provided to neutralize partially the effect of rotor reactance at these low slip frequencies.

It is within the scope of this invention to provide other means for neutralizing rotor reactance, such as series forcing resistors, constant current generators, negative current feedback, and output power feedback from the stator winding to a slip frequency phase control.

The voltage regulator 158a (FIGURE 7) controls the excitation for the carrier generator, which controls the voltage level in the synchro transmitter, the differential, the demodulators, the generator 145 rotor, and the generator 145 stator. The generator 145 output voltage is so adjusted by this high gain degenerative negative feedback loop that the currents in the two control windings of the magnetic amplifier are approximately equal and oppose each other. Since these currents are derived from the generated voltages of the two generators, the regulator makes the voltage of generator 145 follow generator 142. These two voltages can be made equal by adjusting resistors 170 and 171. The voltage control for the entire system is the direct current supply 156 and the adjustable resistor 157. If resistor 157 is decreased, the generator 142 voltage will increase, and then the voltage regulator will correspondingly increase generator 145 voltage.

It is within the scope of this invention to use means other than rotary demodulators in the embodiment illustrated in FIGURE 7, for obtaining a three-phase slip frequency for the generator rotor excitation. Also, it is within the scope of this invention to control alternatively several generators, by providing a separate synchro transmitter on shaft 141 for each additional generator. Each generator would compare its voltage with that from generator 142. Each would have its own carrier frequency, and these carrier frequencies would not be synchronized.

I may interchange the order or power flow through the synchro differential and transmitter, i.e., to mount the synchro transmitter on shaft 144 and the differential on shaft 141, and for the transmitter to be excited first, then the power to flow through the differential, and then back to the demodulator. Also I may provide in a single machine the multiple-pole carrier generator and the two pole synchro transmitter, by arranging three different output windings around the periphery of a multiple-pole reluctance-type generator, and then shaping the multiple poles by providing poles of different lengths and positions, so that during one-half revolution the carrier voltage has one phase, but the amplitude varies sinusoidally with the shaft angle, and during the other half revolution, the phase of the generated carrier voltage reverses, continuing to vary with the sine of the shaft angle. It is further within the scope of this invention to provide the shaft-frequency-modulated carrier generator with integral rotary phase-sensitive demodulators mounted on the shaft within the generator.

FIGURE 8 illustrates an embodiment of this invention applied to two or more aircraft generators with different shaft speeds, to regulate them for equal output currents. The reference speed shaft 172 is connected to a carrier frequency generator (e.g. 2000 c.p.s.) with field winding 173 and armature winding 174, a synchro transmitter with input winding 175 and output windings 176, and two sets of rotary phase-sensitive demodulators 177 and 178. The shaft 179 of engine 1 drives one main 400 c.p.s. generator with output windings 180 and excitation windings 181, and a synchro differential with input windings 182 and output windings 183. The shaft 184 of engine 2 drives another main 400 c.p.s. generator with output windings 185 and excitation windings 186, and a synchro differential with input windings 187 and output windings 188.

A torque angle regulator for the second generator consists of a two phase induction motor 189 with windings 190 and 191, whose shaft drives a reduction gear 192, whose output shaft is connected to a synchro differential with input windings 193 and output windings 194.

A voltage regulator for the second generator consists of a two phase induction motor 195 with windings 196 and 197, whose shaft drives a reduction gear 198, whose output shaft is connected to an insulated slider 199, which moves three contacts on three variable resistors 200, 201, and 202.

A voltage regulator 203 for the first generator can be of any conventional type.

The output current from windings 180 of the first generator is measured by a current transformer with primary winding 204 and secondary winding 205. The output current from windings 185 of the second generator is measured by a current transformer with primary winding 206 and secondary winding 207.

Winding 173 is connected to a direct current supply. The carrier generator output winding 174 is connected in series with the synchro transmitter rotor winding 175. The synchro output windings 176 are connected in parallel with the windings 182 and 193, and supply a 3-wire speed reference bus for other generators which might be connected in parallel. Windings 183 are connected to the input of voltage regulator 203, whose output is connected to the input of the phase-sensitive demodulators 177. The output of the demodulators is connected to the generator excitation windings 181. The generator output windings 180 are connected in parallel with a power output bus across which is also connected in parallel the output from windings 185.

Windings 193 are connected across the speed reference bus, and the modulation-phase-shifted output from windings 194 is connected in parallel with windings 187. The three variable resistors 200, 201 and 202 are connected in series in the three output leads from windings 188 to the input to the phase-sensitive demodulators 178. The output of the demodulators is connected to the rotor windings 186 of the second main generator. The current in the secondary winding 205 of the current transformer is connected to flow in series through winding 191, through winding 197 to the connection junction 210, thence through winding 190 to the connection junction 211, and back to winding 205. The connections to winding 207 are such that current flows from winding 207 in series through winding 196 to junction 210, thence through winding 190 to junction 211, and thence back to winding 207. Between 210 and 211 are connected in parallel two additional components, a condenser 208 and a resistor 209. These components are so chosen that the total current from junction 210 to junction 211 through 190, 208, and 209 in parallel leads in time phase by exactly 90 degrees the component of current through winding 190 alone.

The mechanism of operation for FIGURE 8 is as follows: The carrier power in 174 excites the synchro winding 175 so that windings 176 deliver the carrier voltage modulated at the reference speed. This voltage excites winding 182 of the differential. The output of 183 is modulated at the slip frequency or slip speed of the first engine and generator, and after being demodulated in 177, the slip frequency voltage excites windings 181 of the generator. Windings 180 deliver the desired frequency at a voltage determined by the voltage regulator 203, and a current determined by the load connected to the power output bus.

The carrier voltage modulated at the reference speed from windings 176 also excites windings 193 of the synchro differential whose shaft angle determines the angle of phase shift of the modulation envelope as it appears in the output windings 194. This phase shifted reference excited windings 187 of the synchro differential on the shaft of the second main genertor, and the output in windings 188 is the carrier modulated by the slip frequency with the phase determined by the angle of the shaft from the torque regulator. The voltage magnitude is adjusted by the resistors 200, 201, and 202, after which it is demodulated by 178 and the pure slip frequency applied as excitation in the rotor windings 186 of the second main generator. The generated voltage in windings 185 is therefore also of the desired frequency.

To adjust the two generators to equal currents, use is made of the facts that the in-phase component of a generator current represents power delivered, and can be changed by varying the torque angle, and the out-of-phase component represents reactive kva delivered, and can be changed by varying the magnitude of the excitation, or the no-load generated voltage. If two generators are operating in parallel, delivering approximately equal currents to a resistive load, and if the generator rotor phases and torque angles are exactly equal, but the excitations are different, the dominant effect on the output is to cause an out-of-phase circulating current to flow between the two machines, so that the measured output currents will be approximately equal, but will differ in phase. If two paralleled generators have the same excitation and same no-load voltage, but the internal torque angles and the output powers are different, then the currents will be approximately in phase, but will differ in magnitude. Induction motor 195 measures the difference in phase angle between the currents delivered by the two generators. If the currents in windings 196 and 197 are in-phase, there is no torque, and the motor will not turn. If there is an out-of-phase component, there will be a torque proportional to this out-of-phase component, which will turn the shaft to the gear box 198, and adjust the voltage regulator until the excitation of the second generator has changed sufficiently to make the output currents from the two generators in phase.

The polarities of the windings and connections are so chosen that the difference between the current in winding 205 and the current in winding 207 flows between junction 210 and junction 211 through the parallel combination of 190, 208, and 209. The network is so chosen that the current in winding 190 lags this current difference by 90 degrees. If the current difference is due to a magnitude difference only, then the current in 190 is 90 degrees out-of-phase with the current in winding 191, and there is a resultant torque which rotates the gears 192, and slowly changes the torque angle setting of the synchro winding 194. This changes the torque angle of the second generator, and causes the power component of the load current to redistribute between the generators until the magnitudes of the generator output currents are equal. If the two generator output currents are equal in magnitude, but have a phase difference, then the currents in windings 190 and 191 will either be in phase or 180 degrees out of phase, and there will be no torque in induction motor 189.

It is within the scope of this invention to apply the torque angle regulator and the excitation regulator represented by the induction motors 189 and 195 respectively, and their associated transformers, windings, phase-shift networks, gear boxes, synchros and voltage adjustors, to the other embodiments of this invention described heretofore or hereafter. It is within the scope of this invention to apply this torque angle regulator and this excitation regular to control the governor setting and the exciter respectively in a conventional type of synchronous generator with salient or non-salient poles, but with no provision for rotating the rotor flux field. It is within the scope of this invention to add additional networks between the current transformers and induction motors, including networks connected to the voltage outputs of the two generators, to compute more accurately the desired torque angle and excitation settings, with a minimum of interaction between these two controls. It is within the scope of this invention to use other means for resolving the load currents into components which represent desired excitation and torque angle changes.

FIGURE 9 is a circuit diagram illustrating the production of a reference speed which is the average of several shaft speeds. This circuit is drawn for four generators each similar to the one shown in FIGURE 1. There is a synchro differential 5 mounted on the shaft of each one. The three-wire output bus 11 in FIGURE 1 has voltages which are the carrier modulated with the slip frequency. These slip modulation signals for each generator are shown in FIGURE 9 for generators 1 through 4 as busses 212, 213, 214, and 215, respectively. The differential synchro 216 has its two inputs connected to busses 212 and 213, so phased that the output shaft 217 rotatoes at the sum of the slip speeds of generators 1 and 2. The synchro differential 218 is directly connected to shaft 217, and is energized from bus 214 carrying the slip modulation of generator 3. The output bus 219 of the differential 218 has the carrier modulated with the sum of the slips of generators 1, 2, and 3. In a similar manner, the differential synchro 220 adds the slip of generator 4 from bus 215, so that the synchro output shaft 221 is rotating at the sum of slips 1, 2, 3, and 4.

To shaft 221 is fastened a permanent magnet d-c tachometer 222, whose output voltage is proportional to speed. This voltage appears between conductors 223 and 224 which are connected to the input of a high-gain direct-current null- input type amplifier 225. The sum of the slip speeds should be kept near zero, and the control to accomplish this is the amplifier 225, whose output 226 drives a direct current motor 227. The motor shaft 228 is the reference speed, and it is coupled to the synchro transmitter 229 which converts the unmodulated carrier input 230 into the carrier modulated at the reference frequency which appears on the reference bus 231.

The operation of FIGURE 9 is as follows: Motor shaft 228 runs at whatever speed is required to make the sum of the slips zero, and since this speed is used as the reference speed, the reference is automatically equal to the average of the four generator speeds.

FIGURE 10 shows a method of deriving a reference speed equal to the average of several shaft speeds for use in an embodiment like FIGURE 1. In a multiple-engine system the reference speed should be approximately equal to the average of the several engine speeds in order that the slip frequencies be as small as possible. In FIGURE 10, shaft 232 of engine 1 drives a three-phase wound rotor A-C generator 233 and the synchro differential 234. Shaft 235 of engine 2 drives another A-C generator 236 and synchro differential 237. Shaft 238 of engine 3 drives A-C generator 239 and synchro differential 240. The three generators are identical and have three-phase distributed wound rotors. The inputs to synchro differentials 237 and 240 are in parallel with the three-wire reference bus 241. The ouput bus 242 of synchro 240 and the output bus 243 of synchro 237 are the inputs to a synchro differential 244 to whose shaft 245 is directly connected a synchro transmitter 246 whose rotor input 247 is excited by the two-wire single-phase carrier supply bus, and whose input bus 248 is connected to the input of synchro differential 234. The output of synchro 234 is connected to the reference bus 241. The bus 248 is also connected to the input of a phase-sensitive demodulator 249, whose three-phase slip-frequency output 250 excites the rotor of generator 233.

Operation of FIGURE 10 is as follows: Busses 242 and 243 have the carrier voltage modulated by the slip speeds of shafts 238 and 235 respectively, compared to the speed modulation on the reference bus. Synchro 244 adds the slip speeds for shafts 238 and 235, and delivers the sum as the speed of shaft 245. Synchro 246 converts this slip speed to a modulation on the bus 248. The polarity of the connections of bus 248 to the demodulator 249 are so chosen that the slip for shaft 232 is computed as the negative of the sum of the slips for shafts 235 and 238. The input and output terminal polarities on synchro 234 are so chosen that this synchro adds the speed of shaft 232 to the input signal, which is the sum of the slips of shafts 235 and 238. This synchro 234 therefore adds together and delivers as the sum the three slips and the reference speed. This sum is set equal to the reference speed by being connected to supply the reference bus. Therefore, the sum of the three slips is continuously kept at zero by the frequency of the reference changing to equal the average of the shaft synchronous frequencies.

In this same manner I may compute the average speed of any number of generators. Also I may apply an adaptation of this method to several generators connected as in FIGURE 7 or FIGURE 8.

FIGURE 11 is a block diagram illustrating another embodiment of this invention, applied to control the frequency but not the phase of a generator, by means of an adjustable direct votlage. In FIGURE 11, the turbine 251 drives the main shaft 252 to which is connected the 400 c.p.s main generator 253, a 2000 c.p.s. carrier generator 254, and three rotary phase-sensitive demodulators 255. The power output bus 256 of the main generator 253 is connected to a voltage regulator 257 which controls the direct-current excitation 258 of the carrier generator 254. The bus 256 also supplies a fequency discriminator 259 of a type well known in the art, which delivers a direct-current output voltage 260 which is proportional to the input frequency. A direct-current reference voltage 261 is available, whose magnitude represents the desired frequency from the main generator.

The reference voltage 261 is subtracted from the discriminator output 260 in an electrical subtractor 262, and the difference voltage 263 is amplified in 264 and applied to the armature of a direct-current motor 265. The motor shaft 266 is coupled through reduction gears to a synchro transmitter 267. The synchro rotor is excited by the carrier generator 254 through the cicuit 268. The three-wire synchro output 269 supplied the demodulators 255, and the demodulator outputs 270 are the slip frequency excitation for the three phase wound rotor of the generator 253.

The mechanism of operation of FIGURE 11 is as follows: If the generator frequency is approximately right, the discriminator will deliver a large voltage on circuit 260, which would be approximately equal to the volatge on circuit 261. A very small difference voltage will appear on circuit 263. This is greatly amplified and applied to the armature of the motor 265. The motor torque is proportional to the frequency error. If the shaft 266 drives syncho 267 through reduction gears, the motor speed will be approximately proportional to the frequency error. The synchro slip speed is modulated on the carrier, delivered on circuit 269 to the demodulator, which converts it to slip frequency for the generation rotor excitation. The shaft of the synchro will be turned at the required slip velocity by the presence of a very small voltage on 263, and consequently a very small frequency error. This is a frequency regulator of the degenerative type. If the generator shaft speed changes, the regulatory loop will adjust to the new slip speed, and the voltage on circuit 263 will be slightly different. This slight difference represents a very small change in the output frequency. This is therefore a frequency regulator, not a phase angle regulator as the previously described embodiments have been.

I may apply the embodiment shown in FIGURE 11 to provide an alternate embodiment which eliminates the syncho generator 267. The carbon brushes for the split slip rings of the demodulators 255 can all be mounted on a rotating brush holder, with connections to additional slip rings at the end of the brush holder, so that the brush holder can be continuously rotated slowly in either direction by a small control shaft. Shaft 266 in FIGURE 11 would then be connected to the control shaft for these movable brushes. Generator 254 would be a three-phase generator with as many poles as segments in the segmented slip rings of the demodulators. The three carrier phases would be connected directly to the three demodulators. The output of the demodulators when shaft 266 is turning, would be desired slip frequency. In this case, the demodulators are detecting three carrier voltages of constant amplitude with a continuously changing phase of detection. In FIGURE 8 and the previous embodiments, the demodulators were detecting changes in amplitude of three carrier voltages of constant phase.

FIGURE 12 is a block diagram illustrating another embodiment of this invention, applied to control the frequency but not the phase of a generator, by means of an adjustable direct voltage. In this instance the turbine shaft 271 is directly connected to the large main 400 c.p.s. generator 272 and a small 12-phase 400 c.p.s. generator 273. Generator 272 has a 12-phase wound rotor and a 3-phase wound stator. Generator 273 has a 12-phase wound stator for the output, and a direct-current excitation winding, either on the rotor as in the conventional synchronous generator, or on the stator, as in the reluctance generators. A voltage regulator 274 delivers on circuit 275 a direct current for the excitation of generator 273. The 12-phase 400 c.p.s. output voltage of generator 273 appears on circuit 276, and is the main power supply for the phase-sensitive demodulators 277 used as frequency converters. The output of the demodulators on circuit 278 is a 12-phase slip frequency voltage for the excitation for generator 272. The output circuit 279 from the main generator is connected to the load, and in addition, is connected to the voltage-measuring elements of the voltage regulator 274, and to a frequency regulator. The frequency regulator consists of a frequency discriminator 280, a subtractor 281, and a variable-frequency oscillator 282. The direct-current output circuit 283 of the discriminator, and a direct current reference voltage circuit 284 are the two inputs to the subtractor 281. The output circuit 285 of the subtractor has on it an amplified error voltage which controls the frequency of oscillation of the variable frequency oscillator 282. This variable frequency appears on circuit 286 and is the reference frequency for the frequency converters or phase-sensitive demodulators 277.

Thus, in FIGURE 12 two contol loops are shown. One is an inner open loop consisting of shaft 271 of the main generator, a generator 273 mounted on the shaft 271, circuit 276, phase sensitive demodulators 277, connected by circuit 278 to the field of the main generator 272, and the other is an outer feedback loop consisting of a circuit 279 which is the output of the main generator having a control frequency of 400 c.p.s. connected to discriminator 280 which produces a voltage proportional to the frequency on circuit 283 connected to the subtractor 281. The subtractor 281 provides a difference between the voltage proportional to the output frequency of the main generator and the reference voltage on circuit 284. The difference voltage, termed an "error voltage," is applied by circuit 285 to an adjustable frequency oscillator 282 which applies a single phase, 400 c.p.s. voltage on circuit 286 (assuming that 400 c.p.s. is the desired control frequency output from the main generator 272 to the phase sensitive demodulator 277, then to the field of the main generator 272 by circuit 278. The reference signal for the inner loop is the single-phase voltage appearing on the circuit 286.

Operation of FIGURE 12 is as follows: The D-C voltage on circuit 283 is almost equal to that on circuit 284, but is of opposite polarity. If the frequency of the main output bus 279 should decrease, the frequency discriminator 280 would deliver a smaller voltage on circuit 283. The error voltage on circuit 285 would increase and the frequency of the oscillator 282 would increase. The frequency on circuit 286 is something like the reference frequency in the previous embodiments. As this frequency increases, the output slip frequency on circuit 278 is made less positive. This means that if the shaft speed were above the synchronous speed, the positive slip frequency in generator 272 is subtracting from the flux velocity. The regulator reduces this slip frequency, which makes the instantaneous flux velocity increase, and makes the output frequency on circuit 279 increase. If the shaft speed is below the synchronous speed, the negative slip frequency in generator 272 is adding to the flux velocity. When the regulator increases the frequency on circuit 286, the negative slip frequency increases, and again the flux velocity is increased, and the output frequency on circuit 279 increases just enough to offset the measured error.

Thus, the system shown in FIGURE 12 operates to produce a "constant" frequency output with the inner open loop utilizing the frequency of the voltage on line 286 as a reference. The outer feedback loop makes it possible to manually adjust accurately the output frequency of the main generator 272. In normal operation of the system in FIGURE 12 at a given frequency, as for example, the 400 c.p.s. indicated in FIGURE 12, the reference voltage 284 is kept constant and the action of the outer loop is such that the frequency on the circuit 286 is also kept constant and, therefore, the inner loop maintains a frequency on line 279 fixed and equal to the reference frequency which appears on circuit 286.

The variable-frequency oscillator 282 can be of any of the forms well known in the art. It could be a reactance-tube oscillator, a d-c tuned relaxation oscillator, or a solenoid-operated mechanically-tuned RC oscillator. It is within the scope of this invention to combine the discriminator, subtractor, and oscillator tuning mechanism into one solenoid and restraining spring assembly, in which the desired frequency is adjusted by the spring tension. It is within the scope of this invention to use any number of phases above two in the generator 273, in the excitation windings for the generator 272, and in the demodulators or frequency converters. Twelve phases were chosen as a convenient number to reduce the ripple in the slip frequency for excitation.

In most of the previous embodiments, the demodulators detected changes in amplitude of a carrier frequency whose phase did not change. In this particular embodiment (FIGURE 12), the demodulators detect the change in phase between two signals whose amplitudes do not change. This could be called a frequency converter with equal validity. It suppresses the carrier and delivers a multiple-phase beat frequency between two high-frequency inputs. When the demodulator detects phase change instead of amplitude change, one of the inputs, either the power supply or the grid excitation, should be a square-wave voltage, and the other input should be a sine-wave voltage, in order to reduce the amount of the second-harmonic distortion in the slip frequency output. The demodulator in FIGURE 2 is automatically of this type, since the slip ring commutation is a square wave. The demodulator in FIGURE 3 will operate in this manner if the cathode bias resistors are shorted and if the grid voltage is sufficiently great to drive the tubes either to cut-off or to saturation during most of each half-cycle. Or alternatively, if it is desired that the grid voltages be sinusoidal, the cathode bias resistors should remain, the grid voltages should be in the linear grid characteristic region, and pentode tubes should be used, so that the plate currents are relatively independent of the plate voltages.

I can modify FIGURE 12 as shown in FIGURE 12A to provide an embodiment in which the positions of the generator 273 and the oscillator 282 are interchanged. In this case, the error voltage 285 would control the frequency of a three-phase oscillator, which through transformer connections would be converted to 12 phase. A single-phase generator would be mounted on shaft 271 and would provide the reference frequency. Or alternatively as shown in FIGURE 12B, the single-phase generator may be entirely eliminated by mounting 12 rotary demodulators on shaft 271, and supplying them directly from the 12-phase transformer connections on the oscillator. The demodulator output would be the desired 12-phase slip frequency.

I can construct an embodiment similar to that in FIGURE 12 as shown in FIGURE 12C, except that items 280 through 285 inclusive would be omitted, and circuit 286 would be a direct connection from a tuning fork or other precision frequency supply to the reference control for the phase-sensitive demodulators 277. In this case the generator would be phase regulated as well as frequency regulated.

FIGURE 13 is a block diagram illustrating an embodiment of this invention applied to a power plant stationary generator. In this application it provides automatic synchronizing and increases the steady-state and transient stability. Since stationary generators are usually quite large, the excitation power is considerable, and multiple-phase slip-frequency amplifiers must be provided.

In FIGURE 13 the main 60 c.p.s. generator 287 is connected by a common shaft 288 to a synchro differential 289. The control circuit consists of a single-phase 400 c.p.s. carrier supply bus 290 which provides the power input to a voltage regulator 291. The output circuit 292 of the voltage regulator carries the regulated 400 c.p.s. voltage to a synchro transmitter 293 whose three-wire output 294 excites the input windings of a synchro differential 295 whose shaft 296 is rotating at a synchronous speed and phase corresponding to the desired generated frequency and phase. This shaft is the reference speed, and is connected to a small synchronous motor 297 with a large flywheel, which is energized by circuit 298, which is connected to the power system bus 308 to which the generator will be automatically synchronized after reaching full speed.

The output circuit 299 of the synchro differential 295 is a three-wire 400 c.p.s. carrier modulated with the reference frequency and phase. It energizes the synchro differential 289, whose output 3-wire slip modulation circuit 300 controls the phase-sensitive demodulators 301. The demodulators receive their power from the 400 c.p.s. bus 290. The output circuit 302 of the demodulators carries the three-phase slip frequency voltage to the fields of three single-phase exciters 303. The output circuit 304 of the exciters supplies the excitation power for the wound rotor of the main generator 287. The main generator output bus 305 can be connected to the station bus 308 with the local circuit breaker 306. To the generator output bus 305 is connected a circuit 307 which supplies a measure of the output voltage for the voltage regulator 291. To the station bus 308 is connected a circuit 298 which supplies through a step-down transformer the synchronous motor 297. The shaft 309 of the synchro transmitter 293 is connected through a mechanical latch 310 to a shaft 311 which controls the steady state torque angle of the main generator. This shaft can either be fixed at a particular flux angle setting, or it can be used to regulate the generator power or in-phase component of current. The preferred embodiment is to connect shaft 311 to a gear box like 192 in FIGURE 8, which forms part of an in-phase current regulator like components 189, 190, 191, 192, 204, 205, 206, 207, 208, and 209 in FIGURE 8.

The mechanical latch 310 is operated by a solenoid whose control circuit 312 can be connected to particular transmission line fault relays.

To the output of differential 289 is connected a second circuit 313 which provides the three-wire input to a synchro motor 314. The motor rotor circuit is connected to the carrier bus 290. The motor shaft 315 therefore rotates at slip speed. This shaft is connected through a reduction worm gear 316 to the mechanical speed setting 317 of the speed governor 318. The governor has a connection 319 to the shaft 288 whose speed it measures, and it actuates through linkage 320 the throttle of the prime mover 321.

Operation of FIGURE 13 is as follows: The throttle of the prime mover is opened to start the generator. As it is accelerating, the synchro system 291, 293, 289, 301, and 303, which operates as previously described, delivers a large slip frequency to the generator rotor. As the generator speeds up, the slip frequency decreases, and when it becomes less than some predetermined amount, a synchronizer can close breaker 306, even though the generator is not yet up to speed. The generator will immediately begin to deliver a power corresponding to the torque-angle setting of shaft 309. As long as the generator is running at less than synchronous speed (with negative slip), the shafts 315 and 317 are turning in such a direction as to open the throttle. The speed of the prime mover will therefore continue to change until the slip is reduced to zero. The degenerative feedback loop consisting of the differential 289, synchro motor 314, gears 316, governor 318, and prime mover 321, comprises a speed regulator with integral control, whose basic characteristics are well known in the servomechanisms art. To stabilize this loop, I may add phase shifting networks either in the carrier circuit 313, or mechanical phase shifting devices between shaft 315 and the gears 316.

The rotor power required by generator 287 will be supplied by the exciters 303 and not by the synchro control circuit. A preferred form for the pilot exciters consists of three amplidynes or rotary amplifiers, each one amplifying one phase of the slip frequency, and each supplying the field of a large direct-current generator. These three D-C generators are the main exciters for the three phases of the rotor of generator 287. To assure the correct proportionality between the rotor currents, a current negative feedback circuit for each phase would be provided from the rotor of generator 287 back to current-feedback field windings on the three amplidynes.

The function of the flywheel on the synchronous motor 295 is to "remember" the phase of the power system during fault conditions when the station in which this generator is located is disconnected due to all of the circuit breakers opening. During this time when no power is being delivered, if the in-phase current regulator controlling shaft 309 is inactivated, the flux phase in generator 287 stays constant, and the open circuit voltage advances in phase approximately the amount of the torque angle before the fault condition. The shaft 288 will be accelerating, and the main exciters will be operating as motors. When the circuit breakers are reclosed, the generator will immediately operate at the same torque angle which it had before the fault. If the transmission line impedances are the same, and if the remote power system phase has not changed, the generator will deliver after automatic reclosing the same amount of power which it did before the fault, because the rotor control has retarded the flux angle position by exactly the amount of the generator shaft angle advance. There will be a slight positive slip which will cause the worm gear to reduce slowly the throttle setting on the turbine until the slip returns to zero.

If the transmission line impedances have changed due to the loss of one or more lines, then when the in-phase current regulator is reactivated by the circuit breaker reclosing, it will quickly shift shafts 309 and 311 to a new larger torque angle, so that the generator is delivering over the remaining lines the same amount of power which it previously transmitted over several lines. This will continue until auxiliary relays alter the flux angle setting to an amount commensurate with the power handling capabilities of the remaining transmission line or lines. The general characteristic of this kind of control is that the electrical power changes can be adjusted independently of the shaft speed transients.

In a conventional system, when a generator is automatically reclosed on a line, the additional rotational energy stored in the rotor during the unloaded period must be transferred to the power system, and contributes to the velocity oscillation of the rotor. In the embodiment of this invention shown in FIGURE 13, this additional rotational energy is left in the rotor initially as a higher uniform velocity, and then is very slowly removed as the slip is brought back to zero. The transient velocity oscillations are therefore significantly reduced.

In addition, if it is desired that the power flow after reclosing differ markedly from that before the fault, the control from the fault relays 312 can energize a solenoid operated latch 310 to mechanically shift shaft 309 to the new desired torque angle.

If there is no flywheel on the reference speed shaft, the generator without in-phase current control has constant power output characteristics. On short-circuits, the internal torque angle is kept constant, and the current is automatically limited. When lines open, however, the rotor control runs away in the positive slip direction. This acts electrically like a zero inertia machine.

If there is a large flywheel on the reference speed shaft, the generator without in-phase current control keeps a constant torque angle with respect to the rest of the system, On short circuits, the current is excessive, but on open circuits, synchronism is not lost. This acts electrically like a high inertia machine.

If one high-inertia and one low-intertia reference speed shaft is available, each with its synchro transmitter, high speed relay could switch the reference bus from one to the other during fault conditions. During the initial short circuit, the zero inertia control would be used. When the circuit breakers open, the control is switched to the high inertia reference, where it remains until the breakers close again. After reclosing, the zero inertia control would be used again.

A preferred form of obtaining the high inertia reference speed is to have the reference shaft driven by a high inertia direct-current motor from the station batteries. The motor speed is controlled by an adjustable field rheostat which is set by a gear motor. The error between the phase of the reference shaft and that of a synchronous motor running from the power system bus is amplified and used to drive the gear motor. In times of fault, the gear motor is de-energized, so that it can make no changes in the reference speed until the fault transients are over.

If the flux angle setting of shaft 309 is not altered during a power system transient, then the flux phase within the generator can change only as fast as the phase of the reference shaft. The time constant of the reference shaft can be made as great as one pleases by the adjustment of the speed of the field rheostat changes on a D-C motor reference or the moment of inertia and the friction losses of a synchronous motor drive. In this way, a generator with a small moment of inertia can be made to appear to the power system as though it had a very large moment of inertia. This is quite important, for modern machines are built with large moments of inertia at considerable cost to give them desirable transient stability characteristics.

Further, the flux angle setting can be changed very quickly, and this corresponds to a sudden change in the phase of the rotor flux, which in the conventional machine can be achieved only by changing the throttle on the turbine and letting the large rotor inertia assume a new position. The control presented in this invention can achieve phase changes much faster than the best fast acting governors. If desired, a mechanical spring and dashpot can be provided on shaft 309 to limit the speed of power changes or to prevent abuse of the equipment.

The voltage regulator 291 keeps the output voltage on bus 305 at a particular value. If the bus voltage should decrease, the voltage regulator increases the voltage of the single-phase 400 c.p.s. input to the synchro transmitter 293, and this increase appears on all of the rotor control circuits 294, 299, 300, 302, and 304. The magnitude of the flux in generator 287 is therefore increased sufficiently to bring the generated voltage on bus 305 back to the desired value. The magnitude of the voltage on bus 305, combined with the impedance of the external transmission lines, determines the power factor at which the generator operates. The voltage regulator therefore controls the out-of-phase current or reactive power.

This control is unique in that it provides a synchronous generator which can deliver either lagging or leading current depending upon the excitation, and can do so at torque angles greatly in excess of the limits of transient and steady-state stability for conventional synchronous generators.

It is within the scope of this invention to use several stages of amplification in the exciters, and to connect them in any multiple-phase manner, such as open-delta, delta-wye, or Scott T. If the generator is running below synchronous speed, the main exciters will be delivering slip frequency power to the main generator rotor. If the main generator is running above synchronous speed, the main exciters may be operating as motors, absorbing slip frequency power from the rotor, and delivering it to the exciter driving machine.

If the three main exciters are connected to the same shaft, there will be a low value of positive slip (speed above synchronism) for which the total exciter shaft power and torque is zero. An alternate embodiment which is within the scope of this invention is to operate automatically the generator at this particular value of slip, in order that the power rating of the driving motor for the exciters may be kept at a minimum.

An alternate embodiment of the invention is a means for eliminating the driving motor for the main exciters entirely. Instead, I will provide a flywheel connected to the shaft common to the three main exciters. All of the excitation power is then derived by induction action between the main generator armature and rotor, but this differs significantly from an induction generator, because the main generator can delivery lagging current. To keep the shaft 288 turning at this particularly desirable speed, the speed control setting 317 is derived from a speed regulator on the shaft of the flywheel and exciters. The regulator phase is such that when the flywheel reaches the desired speed, the prime mover throttle begins to close, and when the flywheel slows down, the throttle begins to open.

An alternate embodiment which is within the scope of this invention is to provide exciters of the ignitron type, whose conduction angles are controlled by saturable reactor pulse-forming and phase-shifting circuits. The saturable reactors are controlled by the error between a proportion of the actual main generator rotor currents, and the output of the demodulators, which is a voltage representing the desired rotor currents. The ignitrons would operate either as rectifiers or inverters, depending upon whether the generator shaft speed is below or above synchronous speed.

FIGURE 14 is a circuit diagram illustrating another embodiment of this invention using thyratron demodulators, applied to an alternating-current generator. The prime mover shaft 322 is directly connected to a synchro differential 323 whose primary windings 324 are supplied by the carrier frequency voltage modulated with the desired generator frequency. The differential secondary windings 325 energize a six-phase autotransformer supply for the demodulator. The center taps of autotransformers 326, 327, and 328 are connected to the common terminal 329. Conductor 330 connects one terminal of transformer 326 to one of the terminals of synchro winding 325. Conductor 331 connects one terminal of transformer 327 to another of the terminals of synchro winding 325. Conductor 332 connects one terminal of transformer 328 to the third terminal of winding 325. Terminal 333 of transformer 326 has a voltage equal and opposite in phase to that on conductor 330 with reference to the centertap 329.

Transformer 326 is the power supply for one full wave phase-sensitive demodulator containing tubes 334, 335, 336, and 337. Transformers 327 and 328 are the power supplies for two additional demodulators. The tubes may be either high vacuum tubes or thyratons. In this particular embodiment, they are RCA type 2050 thyratrons. A grid transformer 338 has a primary winding 339 energized from the carrier frequency power supply. There is one secondary winding for each tube, and each winding is connected between grid and cathode.

The mechanism of action of the demodulator in FIGURE 14 is like that of the demodulator in FIGURE 3. Tubes 334, 335, 336, and 337 in FIGURE 14 are connected in like manner, and correspond to tubes 45, 46, 47, and 48 respectively in FIGURE 3. The power supply terminals 330 and 333 correspond to terminals 50 and 52. The output conductor 340 in FIGURE 14 corresponds to conductor 56 in FIGURE 3. The demodulated slip frequency current appears between conductor 340 in FIGURE 14 and the centertap of transformer 326. The output of the second demodulator appears between conductor 341 and terminal 329. The output of the third demodulator appears between conductor 342 and terminal 329.

Between conductors 340 and 341 is connected the field winding 343 of a rotary amplifier 344 of the Amplidyne type which is well known in the servomechanisms art. Between conductors 341 and 342 is connected the field winding 345 of another rotary amplifier 346. Between conductors 342 and 340 is connected a resistor 347. Transformers 326, 327, and 328 form a wye-connected supply for the three demodulators, and windings 343 and 345 and resistor 347 form a delta-connected load for the output slip frequency current.

The armature terminal 348 of the rotary amplifier 344 is connected to the external terminal of winding 349 of the main alternating-current generator rotor. This rotor has a distributed three-phase winding connected in Wye. The armature terminal 350 of amplifier 344 is connected to the armature terminal 351 of amplifier 346 and to the external terminal of the generator rotor winding 352. The armature terminal 353 of amplifier 346 is connected to the external terminal of the generator rotor winding 354. The rotary amplifiers therefore form an open-delta slip-frequency power supply for the main generator rotor.

Operation of FIGURE 14 is as follows: When the speed of shaft 322 is less than synchronous speed, synchro winding 325 generates on conductors 330, 331, and 332, three voltages of carrier frequency amplitude modulated by the slip frequency. The demodulator delivers on conductors 340, 341, and 342, a three-phase voltage of slip frequency. This voltage is amplified by the rotary amplifiers, and impressed on the generator rotor, causing slip frequency currents to flow in the A-C generator rotor in such a phase sequence, that the rotor flux rotates at synchronous speed in the air gap. These currents deliver power to the rotor, and the amplifiers 344 and 346 will be operating as generators. When the speed of shaft 322 is greater than synchronous speed, the phase sequence of the A-C generator rotor currents reverses, and the rotor delivers power to the amplifiers 344 and 346. Under these conditions, they will operate as motors.

It should be noted that in FIGURE 3, the power supply for the demodulators came directly from the carrier current generator, and the grid excitation was supplied by the synchros. The demodulators could deliver considerably greater power than the synchro rating. In FIGURE 14, the power for the demodulators is provided by the synchro, just as in FIGURE 2.

FIGURE 15 is a block diagram illustrating another embodiment of this invention applied to regulate the power from a windmill generator. The torque angle compensation for the slip speed is achieved with synchros in a manner similar to that shown in FIGURE 13. In FIGURE 15, items 287 through 308 inclusive are the same as those described for FIGURE 13.

In FIGURE 15 the three-phase slip frequency output of the demodulators 302 is connected by circuit 355 to energize a restrained motor 356 which has a spring 357 connected to the output shaft 358 to prevent it from turning continuously. There are two viscous friction blocks 359 bearing on shaft 358 which exert a retarding torque when the shaft is turning. Shaft 358 is directly connected to the input shaft of the synchro transmitter 293.

Motor 356 is a type designed to deliver a torque proportional to the input frequency. It could be a synchro differential with one winding shorted and a reduced three-phase voltage applied to the other winding. It could be a three-phase version of a type commonly known as a drag-cup motor. The viscous friction blocks 359 could be replaced by an eddy-current brake which is a conducting disk rotating in a magnetic field. Alternatively, the friction could be achieved by a shaft carrying vanes rotating in an oil-filled chamber, or in an air chamber.

The generator shaft 288 is directly connected to a windmill prime mover 360 whose speed governor 361 actuates the windmill blade pitch control 362.

The operation of FIGURE 15 is as follows. The blade pitch control 362 is designed to vary the windmill blades in order to abstract the maximum amount of power from the wind for each speed at which the prime mover might be moving. The synchro 293 determines the electrical torque angle of the generator 287, and therefore is essentially the control on the power output. If the windmill is running steadily at a slow speed, the slip frequency on circuit 355 is constant, the torque on shaft 358 is constant, and the deflection of spring 357 is constant, therefore the torque angle setting of synchro 293 is constant.

If the windmill should accelerate to a higher speed, the torque delivered by motor 356 will change, and the steady state position of shaft 358 will change the synchro 293 to a larger output power setting for generator 287. The motor, spring, and synchro combination 356, 357, and 293, specify a slip-power characteristic for the alternating-current generator. Since the windmill shaft power might fluctuate rapidly, it is desirable that the generator output power be kept constant at the average of the windmill shaft power. This is accomplished by a time delay between the application of torque on shaft 358 and its actual change in position. In this particular embodiment, the friction blocks 359 provide this time delay by absorbing a torque proportional to the shaft 358 velocity. The combination of the spring constant of 357 and the friction coefficient of 359 determines an averaging time constant in a manner well known in the servomechanisms art.

The synchronous motor reference 297 is shown in this embodiment with a large flywheel mounted on the shaft. For slow long-time changes, the synchro 293 controls the torque angle between the flux in generator 287 and its terminal voltage, the latter determining the phase of the synchronous motor 297. For rapid, short-time changes, the motor 297 does not follow the generator terminal voltage phase, so that changes in the torque angle of synchro 293 produce changes in the torque angle of the alternating-current generator and the power system transmission line combined. But a change in torque angle over this larger impedance produces a much smaller change in power than the equivalent torque angle change over the synchronous impedance of the alternating current generator alone. Therefore, the use of the flywheel on motor 297 provides an additional averaging effect for the fluctuations in windmill shaft power, in addition to its advantages for automatic reclosing after faults.

A unique advantage of this generator is that the shaft speed can change sufficiently so that its moment of inertia can act like a flywheel in smoothing out the power flow from the shaft to the electrical circuit. If the speed drops so low that the rotor control cannot follow the slip, the local circuit breaker can be opened. It can be automatically reclosed any time the speed rises above some predetermined minimum.

To prevent generator 287 from being overloaded, and to prevent motor action, mechanical stops may be provided to limit the angular rotation of shaft 358. The positions of these stops can be controlled from current relays in circuit 305.

It is within the scope of this invention to convert the slip frequency on circuit 355 into a voltage proportional to frequency, to impress this voltage on a network consisting of electrical resistors, capacitors, and inductors, to further add non-linear devices, to connect a torque motor between two points in this network, and to actuate the shaft of synchro 293 from this torque motor. In this manner, any desired non-linear slip-torque characteristic and any type of averaging characteristic can be achieved. Further, the characteristics can be changed while the generator is operating.

FIGURE 15 can be modified to provide a synchronous motor with a low moment of inertia instead of 297, and to incorporate all of the power change time delays in the mechanism between motor 356 and synchro 293. Also I can incorporate within the mechanism between motor 356 and synchro 293, provision to compensate for the phase shifts due to the inductances of the fields of the exciters and the main generator rotor. In addition I can provide the entire assemblage of units 356, 357, 358, and 293, including non-linear devices and other dynamic elements, or the electrical equivalent of this assembly, for the purpose of compensating for the slip-frequency phase shifts due to the inductances of the fields of the exciters and the main generator rotor in the embodiments illustrated in FIGURES 1, 7, 8, 10, 12, 13, 14, and any other embodiment of this invention.

FIGURE 16 is a circuit diagram illustrating another embodiment of this invention applied to control the speed-torque characteristic of an alternating-current motor.

In FIGURE 16 a three-phase wound rotor, three-phase wound stator motor 363 is energized from a three-phase 60 c.p.s. supply 364. Its shaft 365 is directly connected to a mechanical load 366, to a synchro differential 367, and to a mechanical tachometer 368. The output shaft of the tachometer 369 has an angular position positional to the speed of the input shaft 365. To shaft 369 is connected a mechanical linkage 370, whose output mechanical motion 371 rotates the shaft of another synchro differential 372.

A small synchronous motor 373 excited from the supply 364, rotates its shaft 374 at the reference speed and phase. To this shaft is connected a synchro transmitter 375 which is excited by circuit 376 from a 400 c.p.s. carrier supply. The three-wire transmitter output 377 excites synchro 372, whose three-wire output 378 excites synchro 367. The slip-modulated output 379 of synchro 367 controls the grid circuits of the phase-sensitive demodulators 380, whose power comes from circuit 381 connected to the 400 c.p.s. supply. The slip frequency output of the demodulator 382 excites the rotor of the A-C motor 363.

Operation of FIGURE 16 is as follows: Transmitter 375 modulates the 400 c.p.s. carrier with the line 60 c.p.s. frequency and phase, and this appears on the three-wire circuit 377. Synchro 372 shifts the phase of the modulation. Synchro 367 subtracts from the modulation a frequency synchronously related to the actual speed of shaft 365. Circuit 379 has the carrier voltage modulated with the slip frequency between the synchronous frequency of shaft 365 and the 60 c.p.s. supply. Circuit 382 has the three-phase slip frequency after demodulation, and is connected to the rotor with such a phase sequence that the rotor flux is rotating at synchronous speed in space in the same direction as the shaft rotation. The internal motor torque angle is constant, and therefore the motor is abstracting a power proportional to speed from the alternating current supply, and delivering a constant torque regardless of the shaft load torque. If tachometer 368 were disconnected, the shaft 365 speed would change until the load torque were equal to the motor torque.

The motor torque can be varied by rotating the shaft of synchro 372. To control the speed-torque characteristic, the speed is measured by the tachometer 368, and shaft 369 is rotated an angle proportional to this speed. If a linear speed torque curve is desired, the mechanical linkage 370 is a gear train, and shaft 371 rotates an angle proportional to the speed. If a non-linear speed-torque characteristic is desired, an eccentric, cams, or linkages can be used in 370 to obtain the desired relationship.

The A-C motor would have characteristics similar to a high-slip induction motor if shaft 371 were blocked, or rotated only slightly with large speed changes. The A-C motor would have characteristics similar to a synchronous motor if shaft 371 rotated through very large angles for tiny speed changes. This motor has an advantage over conventional synchronous motors in that no special resynchronizing means have to be provided in case the load torque becomes so great that the slip is excessive. To protect the motor, the maximum torque angle should be limited by a mechanical stop limiting the rotation of shaft 371. This motor is uniquely superior to a synchronous motor, for it can be set to run at a constant speed which is not a synchronous speed of the 60 c.p.s. supply.

FIGURE 16 can be modified to provide capacitors in parallel with the rotor circuit of motor 363 to provide rotor reactive kva. at high slip frequencies. The capacity can be chosen for parallel resonance at two-thirds of the maximum slip frequency expected.

FIGURE 17 is a block diagram illustrating another embodiment of this invention applied to control the slip-torque characteristic of a motor, utilizing a fundamental frequency reference for deriving the rotor excitation.

In FIGURE 17, an alternating current motor 383 of conventional 3-phase wound rotor induction motor construction has mounted on its shaft 384 three directly connected rotary phase-sensitive demodulators 385, 386, and 387, like those in FIGURE 2, used as frequency converters. To the end of 384 is connected another shaft 388 with three more demodulators 389, 390, and 391, also like those in FIGURE 2, but with shaft 388 rotated 120 degrees with respect to shaft 384, so that commutation of the segmented slip rings occurs 120 mechanical degrees later for the second three demodulators than for the first three. To the end of shaft 388 is directly connected shaft 392, also carrying three demodulators, 393, 394, and 395. Shaft 392 is rotated an additional 120 degrees, so that commutation of the segmented slip rings occurs 240 mechanical degrees later for the third three demodulators than for the first three.

To the 60 c.p.s. three-phase supply bus 396 is connected the stator circuit 397 of the A-C motor 383, and the input circuit 398 for three single-phase induction regulators 399 which can adjust the voltage but will not alter the phase of the three phases. The output voltage on circuit 400 can be controlled by the setting of the regulator shaft 401. Circuit 400 excites a three-phase phase shifter 402 constructed like a blocked-rotor induction motor. The input shaft 403 controls the phase shift on the three output conductors 404, 405, and 406.

The voltage between conductors 404 and 405 will be called phase A, and this voltage provides the excitation for the demodulators 385, 389, and 393. The voltage between conductors 405 and 406 will be called phase B, and this voltage provides the excitation for the demodulators 386, 390, and 394. The voltage between conductors 406 and 404 will be called phase C, and this provides the excitation for the demodulators 387, 391, and 395. The output of each demodulator is a slip frequency plus a 120 cycle-per-second ripple. The output voltage of demodulator 385 appears between conductors 407 and 408. The output voltage of 390 appears between conductors 408 and 409. The output voltage of 395 appears between conductors 409 and 410. These three outputs have slip frequency components in phase, and ripple frequency voltages 120 degrees out of phase. The sum of the three voltages appears between conductors 407 and 410. The output voltage of demodulator 386 appears between conductors 411 and 412. The output voltage of 391 appears between conductors 412 and 413. The output voltage of 393 appears between conductors 413 and 414. These last three outputs have slip frequency components in phase, and the sum of the three voltages appears between conductors 411 and 414. The output voltage of 387 appears between conductors 415 and 416. The output voltage of 389 appears between conductors 416 and 417. The output voltage of 394 appears between conductors 417 and 418. These last three voltages have slip frequency components in phase, and the sum of the voltages appears between conductors 415 and 418. Conductors 410, 414, and 418 are connected together to form the center-top of a Y connection, and conductors 407, 411, and 415 comprise a slip-frequency three-phase voltage supply. These three conductors excite the rotor winding of the motor 383, and also the main winding of a small restrained torque motor 419, whose shaft 420 is prevented from turning continuously by the spring 421. This motor is designed to deliver a torque proportional to input frequency, and is similar to motor 356 in FIGURE 15. The shaft 420 actuates a mechanical linkage 422 which rotates shaft 403 of the phase shifter 402.

Operation of FIGURE 17 is as follows: The three-phase 60 c.p.s. voltage is impressed on the demodulators used as frequency converters, and is commutated at the actual shaft speed, which will produce an output D-C varying at the slip frequency of the motor rotor. The first three demodulators deliver three-phase slip frequency, and by the addition of other demodulators with different commutating times, the magnitude of the commutation ripple in the slip frequency voltage can be reduced. In the embodiment in FIGURE 17, three sets are shown. Conductors 407, 411, and 415 are connected to the motor rotor in such a phase sequence as to cause the rotor flux to rotate synchronously in the air-gap. If shaft 403 is fixed in position, motor 383 will operate with constant internal torque angle between the flux and the terminal voltage on circuit 397. Rotating shaft 403 will change the internal torque angle. Motor 419 measures the slip and deflects spring 421 with a torque proportional to the slip speed. This turns shaft 420 to an angle proportional to the slip speed. The linkage 422 determines the torque angle represented by shaft 403 in relationship to the slip represented by the angle of 420.

The alternating current motor can be made to draw capacitive current by over-exciting it. The induction regulators 399 provide means for varying the excitation and adjusting the out-of-phase current.

I can modify FIGURE 17 to provide a complex network of mechanical dynamic and non-linear devices between 419 and 403 as a means for achieving any desired slip-torque characteristic, or change of characteristics with time. Also, I can provide means for manually or automatically changing the slip-torque characteristics while the motor is running. In addition I can use, with the alternating-current motors, any of the embodiments shown applied to generators, and to use with alternating-current generators any of the embodiments shown applied to motors.

In the embodiments shown in FIGURES 1, 7, 8, 9, 10, 11, 13, 14, 15, and 16, a high frequency carrier voltage was used with synchros to measure the main A-C generator or motor shaft speed, or the reference speed, or both. In FIGURE 12 was represented an embodiment of this invention applied to control the frequency but not the phase of an alternating current generator which did not use either a higher frequency carrier voltage or synchros. In FIGURE 17 is presented an embodiment applied to control the torque angle of an alternating-current motor, which does not use either a higher frequency carrier voltage or synchros. In FIGURE 12 and FIGURE 17, the reference frequency is the fundamental line frequency, and the shaft speed measurement is either a directly connected demodulator or a directly connected synchronous generator with the same number of poles as the main controlled machine.

With reference to the foregoing embodiments, it is to be understood that I may use any suitable means to measure the shaft speed of an alternating-current machine and to measure the main winding terminal voltage frequency and phase. Also, I can employ any suitable computer to compute and generate the required slip frequency and phase necessary to make the rotor flux rotate at a desired speed and phase with respect to the terminal voltage.

In the embodiments shown in FIGURES 12 and 17, the demodulators used as frequency converters respond to phase differences between the applied voltage and a reference voltage, or to the phase difference between an applied voltage and a commutation instant. Commutation can occur at any time in the cycle, not just when the voltage is zero. To aid commutation, the construction portrayed in FIGURE 18 may be used.

FIGURE 18 shows one of the segmented slip rings of a rotary demodulator, with means for improving commutation. In this instance shaft 423 has mounted on it concentrically a slip ring consisting of two conducting segments 424 and 425, each subtending almost 178 degrees, and in the two spaces between 424 and 425 are located two other conducting segments 426 and 427, each subtending only about two degrees. The four segments are insulated from each other by four mica spacers 428, undercut in the usual manner. Two carbon brushes 429 and 430 are mounted diametrically opposite each other and bear on the slip rings. Conductor 431 connects segment 424 to another slip ring mounted on the same shaft, in a manner similar to segment 24, conductor 28, and slip ring 19 in FIGURE 2. Conductor 432 connects segment 425 to another different slip ring. An electrical resistor 433 is connected by conductor 434 to segment 426, and by conductor 435 to segment 427. The width of the mica 428 is considerably less than the width of the brush 429, so that when the brush is passing over the mica, it makes good electrical contact with both segments 424 and 426. The width of segment 426 is significantly more than the width of brush 429, so that when the brush is centered on segment 426, it does not contact either segment 424 or 425. Segments 426 and 427 have equal dimensions. Segments 424 and 425 have equal dimensions. Brushes 429 and 430 have equal dimensions.

Brushes 429 and 430 are connected to the output circuit which supplies the slip frequency for the generator rotor.

Referring to FIGURE 2, the power supply for this type of rotary demodulator is a transformer winding connected between the brushes 29 and 30. In FIGURE 18, this voltage will appear between conductors 431 and 432. Since commutation can occur at any time during the voltage wave, if brush 429 could contact segments 424 and 425 simultaneously, it could momentarily short the power supply transformer winding. This is prevented in FIGURE 18. Instead, during commutation, first the resistor 433 appears connected across the transformer winding in parallel with the load, then the winding is open circuited when the brushes are riding on segments 426 and 427 alone; next, the resistor 433 and reversed load in parallel appear connected across the transformer again; and lastly, the resistor is removed and the transformer winding is left connected to the brushes with the polarity reversed from the previous connection.

The load winding which is connected between brushes 429 and 430 carries a low slip-frequency current through a highly inductive circuit, and during the time of commutation this can be considered to be a direct current. When brush 429 touches segment 426, the load current divides between the supply transformer winding and resistor 433. When brush 429 is centered on segment 426, there is no load current in the transformer; it is all in the resistor. When brush 429 touches the next main segment, the load current begins to flow again in the supply transformer, but with its direction reversed.

FIGURE 18 provides a means by which a demodulator detecting an A-C signal voltage whose phase is changing, can commutate at times other than the voltage zero without momentarily shorting the supply transformer, and without opening the output load circuit.

FIGURE 18 can be modified to employ other means for facilitating the commutation of the demodulator including multiple brushes, multiple commutating segments, high-resistance brushes, commutating poles and rotating coils, and other means.

FIGURE 19 shows the rotor construction for a synchronously modulated carried frequency generator. This generator can be used in place of 173, 174, 175 and 176 in FIGURE 8. The shaft 436 carries a laminated magnetic structure 437 which rotates with the shaft. The laminations of which 437 is made are punched to provide a number of teeth or projections which rotate in the air gap in such a manner as to vary the reluctance of the air gap to magnetic flux.

On the periphery of the stator is mounted a laminated double pole 438, which subtends a total angle of 45 degrees. It is made of two poles, 439 and 440, each 15° wide, connected by a yoke 441 which bridges a 15° air space between the poles. Around the yoke is wound a direct-current excitation coil 442, and a high-frequency power output coil 443. There are six identical double poles like 438 provided at 60° angles around the stator. The pole structure 444 is one of these, which is diametrically opposite 438 and has a direct-current coil 445 and a high-frequency power output coil 446. The coils on the other poles are not illustrated in FIGURE 19.

The periphery of 437 on the rotor is divided into 24 equal angular positions which will be called teeth if the air gap reluctance is lower than for the adjacent positions, and will be called slots if the air gap reluctance is higher than for the adjacent positions. If the rotor consisted of 12 equally spaced teeth separated by 12 equally spaced slots of width equal to the tooth width, then as the rotor revolved, the reluctance of the flux path for any one pole pair would vary periodically. The variation in flux produced by direct current in winding 442 would generate a voltage in winding 443 whose frequency would correspond to a 12-tooth reluctance generator, or to a 24-pole synchronous generator.

In FIGURE 19, it is desired that this generated high frequency be 200% modulated by a frequency one-twelfth as great, corresponding to one cycle per revolution of the shaft 436. For one-half revolution, the carrier voltage should have one phase, and for the other half revolution the carrier voltage should have the opposite phase. The carrier envelope amplitude should vary sinusoidally with the rotational angle of shaft 436. This is accomplished by making the air gaps for different teeth and different slots of different lengths, so that the change in magnetic reluctance between adjacent positions varies sinusoidally with respect to the angular position.

For the rotor position shown in FIGURE 19, slot 447 has the maximum depth, and teeth 448 and 449 on each side of it are symmetrical and have the maximum height. Teeth 448 and 449 are directly under poles 439 and 440 respectively, and the flux in this pole pair is at a maximum. If shaft 436 is turned to the left, and the air gap measured as each position comes under the pole, slot 450 has less air gap length than slot 447; tooth 451 has more air gap length than tooth 449; slot 452 has less air gap length than slot 450; tooth 453 has more air gap length than toot 451; slot 454 is only 7½° wide, and changes into tooth 45 on the other half of its 15° angular position. At the center point between 454 and 455, the air gap is approximately twice as great as for tooth 449. This position represents a change in phase in the distribution of slots and teeth on the rotor. Slot 456 lies in a position which should have been a pole if the change in phase had not occurred. Diametrically opposite each tooth is a slot.

Operation of FIGURE 19 is as follows: If shaft 436 is rotating counter-clockwise at a uniform speed, for the instant shown in FIGURE 19, the flux in yoke 441 is a maximum, and the instantaneous carrier voltage generated in coil 443 is zero. Seven and one-half mechanical degrees later, the flux in the yoke 441 is changing at its maximum rate, and the instantaneous carrier voltage is a maximum. For each 30° of shaft rotation, the generated carrier voltage goes through a full cycle. The magnitudes of the carrier peaks, however, successively decrease, because the change in the flux from a tooth under the pole to a slot under the pole becomes successively less. Ninety mechanical degrees after the instant shown in FIGURE 19, tooth 453 lies under pole 439, and slot 456 lies under pole 440, so that the rate of change of flux and the generated voltage at this instant are both zero. This is the instant of reversal of phase of the generated carrier voltage in winding 443. Ninety more degrees of rotation brings the carrier voltage envelope to a maximum. Ninety degrees after that, the carrier again reverses phase; ninety degrees after the phase reversal, the voltage envelope again reaches a maximum, which represents a full revolution, and brings the rotor back to the position shown in FIGURE 19.

For poles 60 and 120 degrees from the pole pair 438, the generated carrier voltage is either reversed phase or in phase with that in winding 443, but the modulation phase is 60 and 120 degrees respectively from the modulation phase in winding 443. The voltage from the six poles shown in FIGURE 19 could be connected for 6-phase modulation, for 3-phase delta modulation, or for 3-phase Y modulation. The preferred embodiment is the 3-phase Y modulation connection.

FIGURE 19 can be modified to provide the direct-current excitation for this synchronously modulated generator in windings located on poles of different lengths or shapes on the rotor, and provide a distributed 3-phase winding on the stator. Also, I can employ alternatively a direct-current excitation consisting of windings located on poles on the rotor, the poles having equal air gaps, and the windings having various numbers of turns. In addition, I can alternatively employ a permanent magnet rotor.

In certain of the appended claims I have used language which specifies that the flux provided in the shaft speed sensing device has a frequency of alternation substantially different from and independent of the reference frequency. By this language I mean to include zero frequency of alternation or in other words unidirectional flux such as supplied by a D-C field as well as alternating fluxes which exist in synchros.

I claim:
1. In a system for controlling an alternating current machine of the type having a rotor, at least one power winding and a multiphase excitation winding, one of said windings being mounted on the rotor of the machine, a source of reference frequency bearing a convenient numerical relation to the synchronous speed of the rotor, the system comprising means for sensing the actual rotor rotation, said sensing means producing a voltage which reverses polarity at periodic intervals, said voltage containing a component whose frequency is linearly related to the actual rotor speed, said voltage having a finite value greater than zero and a finite frequency greater than zero for all finite values of rotor speed including when the actual rotor speed equals the synchronous speed, and means responsive both to the sensing means and to the reference frequency and connected to energize the excitation winding of the machine for producing an exciting field which is stationary with respect to the excitation winding when the rotor speed equals the synchronous speed and which otherwise has a rotational speed with respect to the excitation winding equal to the difference between the synchronous speed and the actual speed of the rotor.

2. A system as in claim 1 wherein said voltage has a single frequency which is proportional to the rotor speed.

3. An alternating current machine comprising a rotating shaft, at least one power winding with at least one pole pair, a multiphase excitation winding inductively coupled to said power winding, means mounting said windings to permit rotation of one of said windings relative to the other at the shaft speed, a source of reference frequency, shaft speed sensing means, an output circuit, means for producing a voltage on the output circuit which contains a frequency component equal to the shaft frequency, said shaft frequency being the product of said rotation in revolutions per second times the number of pole pairs in said power winding, a modulator, means coupling said output circuit to said modulator, means coupling the reference frequency to said modulator, said shaft speed sensing means and said modulator in combination serving to produce a multiphase slip frequency signal whose frequency is equal to the difference between said shaft frequency and said reference frequency, said voltage on the said output circuit having a finite value greater than zero and a frequency greater than zero when the slip frequency is zero, and means coupling said modulator to said excitation winding for energizing the excitation winding with the multiphase slip frequency signal to produce a magnetic field in the excitation winding which is caused to rotate relative to the power winding at the reference frequency.

4. A machine as in claim 3 wherein said shaft speed sensing means is a synchronous generator and wherein said voltage on the output circuit reverses polarity at a frequency equal to the shaft frequency.

5. A machine as in claim 3 together with means for producing a predetermined power flow signal, and means for adjusting the time phase of said slip frequency responsive to said power flow signal.

6. An alternating current machine comprising a rotating shaft, at least one power winding, a multiphase excitation winding with at least one pole pair inductively coupled to said power winding, means mounting said windings to permit rotation of one of said windings relative to the other at the shaft speed, a reference source having a reference frequency, shaft sensing means having a signal winding, means for producing voltage in said signal winding which periodically reverses polarity and which includes a frequency component equal to the shaft frequency, said shaft frequency being the product of the shaft speed in revolutions per second times the number of pole pairs in said excitation winding, a frequency converter, means for coupling said signal winding to the frequency converter, means for coupling the reference frequency to the frequency converter, said frequency converter serving to perform the function of demodulation and having an output with a slip frequency equal to the difference between the reference frequency and the shaft frequency, the voltage in said output of the frequency converter having a finite value greater than zero when the slip frequency is zero, and means for energizing the excitation winding with the output of said frequency converter to produce a magnetic field in the excitation winding which is caused to rotate relative to the power winding at the reference frequency.

7. An alternating current machine as in claim 6 wherein said shaft sensing means is a synchronous generator and wherein the voltage in the said signal winding has a frequency equal to the shaft frequency.

8. In a system for controlling an alternating current machine of the type having a rotor, at least one power winding and a multiphase excitation winding, one of said windings being mounted on the rotor, the system comprising means producing a reference signal which is proportional to the desired flux speed relative to the power winding, said desired flux speed being the synchronous speed of the rotor, means producing a modulated voltage whose modulation is linearly related to the rotor speed, said modulated voltage having a finite value greater than zero and a periodically reversing polarity for all values of rotor speed including when the relative speed of the excitation winding with respect to the power winding is equal to the synchronous speed, multiphase modulator means coupled to said means for producing a modulated voltage and to said means for producing a reference signal and serving to produce a multiphase slip frequency, and means for applying said multiphase slip frequency to the excitation winding to produce an exciting field, said exciting field being stationary with respect to the excitation winding when the speed of rotation of the rotor equals the synchronous speed and having a rotational speed with respect to the excitation winding which is equal to the difference between the synchronous speed and the actual speed of the rotor when the rotor speed is asynchronous, the exciting field also having a sense of rotation such that the exciting field rotates synchronously with the power winding.

9. In a system for controlling an alternating current machine of the type having a rotor, at least one power winding and a multiphase excitation winding, one of the windings being mounted on the rotor, the system comprising means for producing a reference signal which is proportional to the desired flux speed relative to the power winding, a synchronous generator connected to the rotor and delivering a voltage whose frequency is equal to a predetermined constant times the rotor speed, multiphase modulator means for mixing said reference signal and said voltage to produce a multiphase slip frequency, said voltage having a finite value greater than zero when said slip frequency is zero, and means for applying said multiphase slip frequency to the excitation winding to produce a magnetic field which rotates at the desired flux speed relative to the power winding.

10. In a system for controlling an alternating current machine of the type having a stator and a rotor, at least one power winding, and a multiphase excitation winding, one of said windings being mounted on the rotor of the machine and the other of said windings being mounted on the stator, the system comprising rotor speed sensing means for sensing the actual rotor rotation, said rotor speed sensing means consisting of a stator and a rotor each having at least one electrical winding, a source of reference frequency bearing a convenient numerical relation to the desired flux speed in the machine relative to the said power winding, means for exciting one of the windings of the speed sensing means with a current having a frequency significantly different from the frequency of said reference source, means responsive both to the means for sensing actual rotor rotation and to the reference frequency to produce a multiphase slip frequency, and means applying the multiphase slip frequency to the excitation winding of the machine for producing an excitation field which has a finite value greater than zero and which is stationary with respect to the excitation winding when the rotor speed equals the said desired flux speed and which otherwise has a rotational speed with respect to the excitation winding equal to the difference between the desired flux speed and the actual speed of the rotor so that the speed of rotation of the flux in said alternating current machine with respect to said power winding is equal to said desired flux speed and so that the frequency of the voltage in said power winding is equal to a predetermined constant times said reference frequency.

11. In an alternating current machine comprising a stator, a rotating shaft rotatably mounted in the stator, a rotor mounted on the shaft and rotating with the shaft, a power winding, a multiphase excitation winding inductively coupled to said power winding, one of said windings being mounted on the rotor and the other of said windings being mounted on the stator so that said one winding is rotated relative to said other winding at the shaft speed, a source of reference frequency, a shaft speed sensing device having an output signal winding, means for providing in the output signal winding a modulated signal voltage with a modulation component of frequency responsive to shaft speed, a modulator coupled to said output signal winding and to said source of reference frequency, said modulator in combination with said shaft speed sensing device serving to produce an excitation signal with a multiphase slip frequency responsive to said reference frequency and the shaft speed, said modulated signal voltage having a frequency greater than zero when said slip frequency is zero, and means coupling said modulator to said multiphase excitation winding for energizing the excitation winding in accordance with said excitation signal whereby the magnetic field produced by said excitation winding is caused to vary relative to said power winding at said reference frequency.

12. A machine as in claim 11 wherein said shaft speed sensing device is a synchronous generator and wherein said modulated signal voltage is frequency-shift modulated.

13. In a system for controlling an alternating current machine of the type having a rotor, at least one power winding and a multiphase excitation winding, one of said windings being mounted on the rotor of the machine, the system comprising means for sensing the actual rotor rotation to produce a first reference signal with a first reference frequency, a source producing a second reference signal with a second reference frequency bearing a convenient numerical relation to the desired flux speed in the machine relative to the power winding, means for producing a torque angle signal, means responsive to both of said reference signals and to said torque angle signal and connected to energize the excitation winding of the machine for producing an exciting field which has a value greater than zero and which is stationary with respect to the excitation winding when the rotor speed equals the desired flux speed and which otherwise has a rotational speed with respect to the excitation winding equal to the difference between the desired flux speed and the actual speed of the rotor, and means responsive to said torque angle signal for controlling the phase angle of said exciting field.

14. A system as in claim 13 including means for producing a predetermined power reference signal, means for measuring the power flow in said power winding, and wherein said torque angle signal is responsive to the difference between said predetermined power reference signal and said measured power flow.

15. A system as in claim 13 together with prime mover means connected to said rotor to rotate said rotor, governor means connected to control the prime mover, said governor means having a governor setting, and means responsive to the difference between the desired flux speed and the actual speed of the rotor to adjust the governor setting whereby the speed of the prime mover is caused to approximate the desired flux speed.

16. A system as in claim 13 together with slip measuring means responsive to the difference between the desired flux speed and the actual rotor speed and wherein said means for producing a torque angle signal is responsive to said slip measuring means.

17. In a system for controlling an alternating current machine of the type having a rotor, at least one power winding and a multiphase excitation winding, one of said windings being mounted on the rotor of the machine, the system comprising a source of reference frequency delivering a first control signal, means for sensing the actual rotor rotation and phase, said means delivering a second control signal, phase adjusting means for adjusting the phase of one of said control signals, and means responsive to said two control signals and coupled to said excitation winding to energize the excitation winding for producing an exciting field which rotates with respect to the excitation winding at a desired flux speed when the rotor speed is zero, and which otherwise has a rotational speed with respect to the excitation winding equal to the difference between the desired flux speed and the rotor speed, and which varies relative to the said power winding at said desired flux speed, said second control signal having a frequency greater than zero when said difference is zero.

18. A system as in claim 17 together with means for producing a predetermined power reference signal, means for measuring the power flow in said power winding, and wherein said phase adjusting means is responsive to the difference between said predetermined power reference signal and said measured power flow.

19. A system as in claim 17 together with slip measuring means responsive to the difference between the desired flux speed and the actual rotor speed, and wherein said phase adjusting means is responsive to said slip measuring means.

20. A system as in claim 17 wherein said means responsive to said two control signals and coupled to said excitation winding includes amplifier means.

21. A system as in claim 17 wherein said source of reference frequency is connected to said power winding of the machine.

22. In a system for controlling an alternating current machine of the type having a rotor, at least one power winding and a multiphase excitation winding, one of said windings being mounted on the rotor, the system comprising means for producing a reference signal synchronously related to the desired flux speed relative to the power winding, means for producing a voltage modulated in accordance with the rotor speed of rotation, intermodulator means for producing a multiphase slip frequency signal responsive to the intermodulation of said reference signal and said modulated voltage, and means for applying said multiphase slip frequency signal to said excitation winding to produce an exciting field which rotates with respect to the excitation winding at a speed proportional to the slip frequency of the said slip frequency signal and which rotates with respect to the power winding at the desired flux speed, said modulated voltage having a finite value greater than zero when the slip frequency is zero, and said multiphase slip frequency signal having a voltage with a finite value greater than zero when the slip frequency is zero.

23. A system as in claim 22 together with means for measuring the voltage on said power winding, and means for adjusting the magnitude of the said exciting field responsive to the said measured voltage on the power winding.

24. A system as in claim 22 wherein said means for applying said multiphase slip frequency signal to said excitation winding includes amplifier means.

25. In a system for controlling an alternating current machine of the type having a rotor, at least one power winding, and a multiphase excitation winding, one of the windings being mounted on the rotor, the system comprising means producing an input reference signal synchronously related to the desired flux speed relative to the power winding, means for producing a modulated signal modulated in accordance with the rotor rotation, said modulated signal being frequency modulated with a frequency equal to a predetermined constant times the rotor speed, means for producing a multiphase slip frequency responsive to the intermodulation of said reference signal and said modulated signal, said multiphase slip frequency having a voltage with a finite value greater than zero when the slip frequency is zero, and means for applying said multiphase slip frequency to said excitation winding to produce an exciting field which rotates with respect to the excitation winding at a speed proportional to the slip frequency and which rotates with respect to the power winding at the desired flux speed.

26. In a system for controlling an alternating current machine having a rotor, a power winding, a multiphase excitation winding inductively coupled to said power winding, one of said windings being mounted on the rotor and the other of said windings being stationary, the system comprising a reference source having a reference frequency, sensing means for sensing rotor rotation, said sensing means including a signal winding, means for producing a multiphase slip frequency responsive to the intermodulation of the reference and the sensed rotor rotation, means coupling said signal winding and said means for producing a multiphase slip frequency, means for adjusting the phase of the multiphase slip frequency, and means for applying said multiphase slip frequency to said excitation winding to produce an exciting quency to said exicitation winding to produce an exciting field whereby the relative motion of the exciting field with respect to the power winding is at said reference frequency, the magnitude of said exciting field being finite and greater than zero when the said slip frequency is zero and being substantially independent of variations in said slip frequency when said slip frequency is substantially zero.

27. Apparatus for producing alternating current having a controlled frequency comprising an alternator having an armature for producing an alternating current output and having field producing means for producing a rotatable magnetic field for the armature, means coupled to the alternator for producing a first reference signal having a frequency which is proportional to the speed of rotation of the alternator, means for providing a second reference signal of predetermined frequency, and means coupled between the means for producing the first and the second reference signals and the field producing means of the alternator for providing control signals to the field producing means to control the direction and the speed of rotation of the magnetic field.

28. Apparatus for producing alternating current having a controlled frequency comprising an alternator having an armature for producing an alternating current output and having a plurality of field windings for producing a magnetic field for the armature, the field windings providing a plurality of magnetic poles disposed around the direction of rotation of the armature, means for producing relative rotary motion between the field windings and the armature, means for producing a first reference signal having a frequency which is proportional to the speed of rotation between the field windings and the armature, means for providing a second reference signal of predetermined frequency, means for comparing the first and second reference signals and providing a plurality of control signals having frequencies which are governed by the difference in the frequencies of the first and second reference signals and having phase relationships which are governed by the phase relationships of the first and second reference signals, and means coupling the control signals to the field windings to control the direction and speed of rotation of the magnetic field which is produced by the field windings and thereby control the frequency of the alternating current which is produced by the armature in accordance with the frequency of the second reference signal.

29. Apparatus for producing alternating current having a controlled frequency comprising an alternator having an armature for producing an alternating current output and having a plurality of field windings for producing a magnetic field for the armature, the field windings having a plurality of phases and providing a plurality of magnetic poles disposed around the direction of rotation of the armature, means for producing rotary motion between the field windings and the armature, tachometer means coupled to the alternator for producing first reference signals having a frequency which is proportional to the speed of rotation between the field windings and the armature, a generator for providing a second reference signal of predetermined frequency, demodulator means responsive to the first and second reference signals for providing a plurality of control signals having frequencies which are governed by the difference in the frequencies of the first and second reference signals and having phase relationships which are governed by the phase relationships of the first and second reference signals, with the number of control signals corresponding to the number of phases for the field windings of the alternator, and means coupling the control signals to the field windings to control the direction and speed of rotation of the magnetic field which is produced by the field windings and thereby control the frequency of the alternating current which is produced by the armature in accordance with the frequency of the second reference signal.

30. The apparatus of claim 29 wherein the demodulator means comprises means for adding and for subtracting the second reference signal and the first reference signals which are produced by the tachometer means and for providing control signals representative of the net difference between the sum and the difference of the signals, and means coupling the control signals to the field windings of the alternator to control the direction and speed of rotation of the magnetic field which is produced by the field windings and thereby control the frequency of the alternating current which is produced by the alternator in accordance with the frequency of the second reference signal.

31. A frequency stabilization system of the class described which includes: a prime mover having a governor acting to maintain the speed of said prime mover substantially at a predetermined value; an alternator driven by said prime mover and having an armature and field windings; a reference generator driven by said prime mover and providing an output signal whose frequency is proportional to the speed of said prime mover; a frequency standard providing a constant frequency output signal; comparison means responsive to the outputs of said reference generator and said frequency standard and comparing the output signals thereof to provide a control signal; and means adapted to energize said field windings in accordance with said control signal, whereby the magnetic field produced by said field windings is caused to rotate with respect to said armature to compensate for deviations in the speed of said prime mover.

32. A method of generating a constant-frequency alternating current wherein a main generator of the non-salient-pole type having a polyphase stator winding has its rotor driven approximately at the ideal speed (the speed at which the generator output is of the desired frequency when the exciting field produced by the stator windings is stationary), while means responsive both to the actual rotor speed and to a reference frequency energises the stator winding of the main generator for producing an exciting field having a rotational speed equal to the difference between the ideal speed and the actual speed of the main generator rotor and a sense of rotation such that the rotor and exciting field have a relative rotational speed equal to the ideal speed, said exciting field being produced by measuring the rotor speed, producing a unidirectional flux, generating a signal voltage with a signal frequency proportional to the rotor speed by the interaction of the rotor speed with the unidirectional flux, intermodulating said reference frequency and said signal voltage to produce a beat frequency whose frequency equals the difference betwene the reference frequency and the signal frequency, and energizing the stator winding with the beat frequency.

33. A system for generating a constant-frequency alternating current comprising a main generator of the non-salient-pole type having a polyphase stator winding, means for rotating the generator rotor at a speed approximating to the ideal rotor speed, a source of reference alternating voltage of a frequency bearing a convenient numerical relation to the ideal speed of the generator, and means responsive both to the actual rotor speed of the main generator and to the reference frequency and connected to energise the polyphase stator winding of the main generator for producing an exciting field which is stationary when the rotor speed equals the ideal speed and which otherwise has a rotational speed equal to the difference between the ideal speed and the actual speed of the main generator rotor and a rotational speed relative to the rotor which is equal to the ideal speed, said means responsive both to the actual rotor speed of the main generator and to the reference frequency comprising a rotor speed sensing device with two magnetic structures, the first magnetic structure being stationary and the second magnetic structure being coupled to the said rotor and arranged to rotate relative to the first at a speed proportional to the rotor speed, flux producing means producing in one of said magnetic structures a magnetic flux, a signal winding magnetically coupled to the other of said magnetic structures whereby the interaction of the rotor speed and the said magnetic flux generates in the said signal winding a voltage with a periodically reversing polarity, said voltage containing a component whose frequency is linearly related to the rotor speed, said voltage having a finite value greater than zero and reversing polarity at regular intervals when the actual rotor speed is equal to the said ideal rotor speed, a multiphase modulator with two high-frequency circuits and with a low-frequency multiphase circuit connected to said stator winding, and means for electromagnetically interconnecting said two high-frequency circuits with said signal winding and said reference alternating voltage.

34. Apparatus for producing alternating current having a controled frequency comprising an alternator having an armature for producing an alternating current output and having a plurality of field windings for producing a magnetic field for the armature, the field windings providing a plurality of magnetic poles disposed around the direction of rotation of the armature, means for applying alternating current signals to the respective field windings to cause the field windings to produce a rotating magnetic field, and means for controlling the phase relationship and frequency of the alternating currents which are applied to the field windings so as to control the direction and speed of rotation of the magnetic field which is produced by the field windings, said last named means including a source of reference ferquency bearing a convenient numerical relation to the desired speed of rotation of the magnetic field relative to said armature, sensing means for sensing the relative motion of the said field windings with respect to the said armature, said sensing means producing a voltage containing a component whose frequency is linearly related to the said relative motion, said voltage having a finite value greater than zero and reversing polarity at regular intervals when said relative motion equals said desired speed of rotation, the phase relationship and frequency of the alternating currents which are applied to the field windings being responsive to said voltage and to said reference frequency.

35. Apparatus for producing alternating current having a controlled frequency comprising an alternator having an armature for producing an alternating current output and having a plurality of field windings for producing a magnetic field for the armature, the field windings providing a plurality of magnetic poles disposed around the direction of rotation of the armature, means for applying signals to the respective field windings, and means for controlling the phase relationship and frequency of the respective signals which are applied to the field windings so as to control the magnetic field which is produced by the field windings and thereby control the frequency of the alternating current which is produced by the armature, said last named means including means for producing a reference signal which is proportional to the desired speed of the magnetic field relative to said armature, means for producing a voltage which contains a frequency component linearly related to the actual relative speed of rotation between the armature and the field windings, said voltage having a finite value greater than zero and a periodically reversing polarity when said actual relative speed of rotation between the armature and the field windings is equal to said desired speed, and multiphase modulator means electromagnetically coupled to said reference signal and said voltage and serving to produce said respective signals which are applied to the field windings.

36. In a method for controlling an alternating current machine of the type having a rotor, at least one power winding and a multiphase excitation winding inductively coupled to said power winding, the windings being mounted to permit rotation of one of said windings relative to the other at the rotor speed, the steps of producing a reference frequency bearing a convenient numerical relation to the synchronous speed of the rotor, sensing the rotor rotation, producing a voltage containing a component whose frequency is linearly related to the actual rotor speed, said voltage having a finite value greater than zero and periodically reversing polarity for all finite values of rotor speed greater than zero including a rotor speed which equals the synchronous speed, producing a slip frequency signal responsive both to the sensed rotation and to the reference frequency and energizing the excitation winding in accordance with the slip frequency signal to produce an exciting field which is stationary with respect to the excitation winding when the rotor speed equals the synchronous speed and which otherwise has a rotational speed with respect to the excitation winding equal to the difference between the synchronous speed and the actual speed of the rotor and which rotates relative to the power winding at the synchronous speed.

37. A method for controlling an alternating current machine of the type having a rotor, at least one power winding and a multiphase excitation winding inductively coupled to said power winding mounted to permit rotation of one of said windings relative to the other at the rotor speed, comprising the steps of producing a reference signal which is proportional to the desired flux speed relative to the power winding, producing a voltage whose modulation is linearly related to the rotor speed, said voltage having a finite value greater than zero and reversing polarity at regular intervals for all finite values of rotor speed greater than zero including when the relative speed of the excitation winding with respect to the power winding is equal to the desired flux speed, producing a multiphase slip frequency by the phase sensitive demodulation of said voltage using said reference signal as a phase reference, and applying said slip frequency to said excitation winding to produce an exciting field, said exciting field being stationary with respect to the excitation winding when the speed of rotation equals the desired flux speed and having a rotational speed with respect to the excitation winding which is equal to the difference between the desired flux speed and the actual speed of the rotor when the rotor speed is asynchronous, the exciting field also having a sense of rotation such that the exciting field rotates at the desired flux speed relative to the power winding.

38. In a system for controlling an alternating current machine of the type having a rotating shaft and at least one power winding, a multiphase excitation winding, means for measuring the shaft speed of the machine, means for generating a modulated carrier voltage whose modulation is synchronously related to the difference between the shaft speed and a predetermined flux speed, means for phase sensitive demodulating said voltage using the phase of the carrier frequency as a reference to obtain a slip frequency voltage, and means for exciting said excitation winding with said slip frequency voltage.

39. In a system for controlling an alternating current machine of the type having a rotating shaft and at least one power winding, a multiphase excitation winding, means for measuring the shaft speed of the machine, means for generating a modulated carrier voltage whose modulation is synchronously related to the difference between the shaft speed and phase and a predetermined flux speed and phase, phase sensitive demodulator means for demodulating said voltage using the phase of the carrier frequency as a reference to obtain a slip frequency voltage, and means for exciting said excitation winding with said slip frequency voltage.

40. A system as in claim 39 wherein the predetermined flux speed and phase is synchronously derived from the terminal voltage of the power winding of said machine.

41. In a system for controlling an alternating current machine of the type having a rotating shaft and at least one power winding, a multiphase excitation winding, means for measuring the shaft speed of the machine, means for generating a modulated carrier voltage whose amplitude modulation is synchronously related to the difference between the shaft speed and a predetermined flux speed, phase sensitive demodulator means for demodulating said voltage using the phase of the carrier frequency as a reference to obtain a slip frequency voltage, and means for exciting said excitation winding with said slip frequency voltage.

42. In a system for controlling an alternating current machine of the type having a rotating shaft and at least one power winding, a multiphase excitation winding, means for measuring the shaft speed of the machine, means for generating a plurality of modulated carrier voltages whose amplitude modulation is synchronously related to the difference between the measured shaft speed and a predetermined flux speed, phase sensitive demodulator means for demodulating said modulated voltages using the phase of the carrier frequency as a reference to obtain a plurality of slip frequency voltages, and exciting the excitation winding with said slip frequency voltages.

43. In a system for controlling an alternating current machine of the type having a rotating shaft and at least one power winding, a multiphase excitation winding, means for measuring the shaft speed of the machine, means for generating a modulated carrier voltage whose amplitude modulation is synchronously related to the difference between the measured shaft speed and a predetermined flux speed, phase sensitive demodulator means for demodulating said voltage using the phase of the carrier frequency as a reference to obtain a slip frequency, and means for exciting said excitation winding with said slip frequency voltage, and means for adjusting the time phase of said slip frequency voltage in relation to the time phase of the predetermined flux speed.

44. In a system for controlling an alternating current machine of the type having a rotating shaft and at least one power winding, a multiphase excitation winding, means for measuring the shaft speed of the machine, means for generating a modulated carrier voltage whose amplitude modulation is synchronously related to the differene between the measured shaft speed and a predetermined flux speed, phase sensitive demodulator means for demodulating said voltage using the phase of the carrier frequency as a reference to obtain a slip frequency voltage, means for exciting the excitation winding with said slip frequency voltage, and means for adjusting the time phase of the slip frequency voltage in relation to the time phase of the terminal voltage of the power winding of the machine to thereby effect a torque angle control.

45. In a system for controlling an alternating current machine of the type having a rotating shaft and at least one power winding, a multiphase excitation winding, means for measuring the shaft speed of the machine, means for generating a modulated carrier voltage whose amplitude modulation is synchronously related to the difference between the shaft speed and a predetermined flux speed, phase sensitive demodulator means for demodulating said voltage using the phase of the carrier frequency as a reference to obtain a slip frequency voltage, and means for adjusting the amplitude of said slip frequency voltage in accordance with the difference between the power winding terminal voltage and a predetermined voltage, and means for exciting the excitation winding of said machine with said adjusted slip frequency voltage.

46. In a system for controlling an alternating current machine of the type having a rotating shaft and at least one power winding, a multiphase excitation winding, means for measuring the shaft speed of the machine, means for generating a modulated carrier voltage whose amplitude modulation is synchronously related to the different between the shaft speed and a predetermined flux speed, means for generating an unmodulated carrier voltage having a frequency equal to said modulated carrier voltage, phase sensitive demodulator means for demodulating one of said voltages using the other of said voltages as a reference to obtain a slip frequency voltage, means for exciting the excitation winding of said machine with said slip frequency voltage, and means for adjusting the instantaneous phase angle of said slip frequency voltage as a function of the shaft speed of the machine.

47. In a system for controlling an alternating current machine of the type having a rotor on a shaft and at least one power winding, a multiphase excitation winding, means for measuring the shaft speed of the machine, means for generating a frequency modulated voltage whose frequency is proportional to the shaft speed, means for generating a second frequency modulated voltage whose frequency is proportional to a predetermined flux speed, phase sensitive demodulator means for demodulating one of said voltages using the other of said voltages as a reference voltage to obtain a slip frequency voltage whose slip frequency is equal to the difference of said two frequencies, and means for exciting the excitation winding of said machine with said slip frequency voltage.

48. In a system for controlling an alternating current machine of the type having a rotor on a shaft and at least one power winding, a multiphase excitation winding, means for measuring the shaft speed of the machine, means for generating a frequency modulated voltage whose frequency is proportional to the shaft speed, means for generating a second frequency modulated voltage whose frequency is proportional to a predetermined shaft speed, phase sensitive demodulator means for demodulating one of said voltages using the other of said voltages as a reference voltage to obtain a slip frequency voltage whose slip frequency is equal to the difference of said two frequencies, and means for exciting the excitation winding of said machine with said slip frequency voltage.

49. In a system for controlling an alternating current machine of the type having a rotor on a shaft and at least one power winding, a multiphase excitation winding, a commutator mounted on said shaft, means for measuring the shaft speed of the machine, means for generating a voltage whose frequency is synchronously related to a predetermined flux speed, phase sensitive demodulator means for demodulating said voltage with said commutator rotating synchronously with the machine shaft to obtain a slip frequency voltage, and means for exciting the excitation winding of said machine with said slip frequency voltage.

50. In a system for controlling an alternating current machine of the type having a rotating shaft, at least one power winding, and a multiphase excitation winding; a reference signal, means for measuring the shaft rotation, means for producing a multiphase slip frequency responsive to the intermodulation of the reference signal and the measured shaft rotation, said means for measuring the shaft rotation producing a voltage which has a frequency greater than zero when the slip frequency is zero and means for applying said multiphase slip frequency to said excitation winding.

References Cited

UNITED STATES PATENTS

| | | | |
|---|---|---|---|
| 2,659,044 | 11/1953 | MacNeil | 322—24 |
| 2,829,333 | 4/1958 | Turvey | 322—61 X |
| 2,854,617 | 9/1958 | Johnson | 322—61 X |
| 2,886,766 | 5/1959 | Gibson | 322—61 X |

FOREIGN PATENTS 589,526   6/1947   Great Britain.

JOHN F. COUCH, Primary Examiner

W. M. SHOOP, Jr., Assistant Examiner

U.S. Cl. X.R.

318—231; 322—31